(12) United States Patent
McGilvray et al.

(10) Patent No.: US 11,356,718 B2
(45) Date of Patent: Jun. 7, 2022

(54) SYSTEMS AND METHODS FOR LOCALIZED ADAPTIVE CONTENT DISTRIBUTION

(71) Applicant: NBCUniversal Media, LLC, New York, NY (US)

(72) Inventors: Grant McGilvray, Denver, CO (US); Clarence Hau, Tenafly, NJ (US); Michael Harrell, Parker, CO (US); Anil Abraham, Upper Saddle River, NJ (US); Peter Rosenberg, New York, NY (US); Adam Dever, Ringwood, NJ (US)

(73) Assignee: NBCUniversal Media, LLC, New York, NY (US)

(*) Notice: Subject to any disclaimer, the term of this patent is extended or adjusted under 35 U.S.C. 154(b) by 0 days.

(21) Appl. No.: 17/323,753

(22) Filed: May 18, 2021

(65) Prior Publication Data

US 2021/0409796 A1 Dec. 30, 2021

Related U.S. Application Data

(60) Provisional application No. 63/046,277, filed on Jun. 30, 2020.

(51) Int. Cl.
*H04N 21/234* (2011.01)
*H04L 65/60* (2022.01)
*H04N 21/2187* (2011.01)
*H04N 21/235* (2011.01)
*H04N 21/2343* (2011.01)
(Continued)

(52) U.S. Cl.
CPC ..... *H04N 21/23424* (2013.01); *H04L 65/601* (2013.01); *H04L 65/605* (2013.01); *H04L 65/607* (2013.01); *H04L 65/80* (2013.01); *H04N 21/2187* (2013.01); *H04N 21/2353* (2013.01); *H04N 21/23439* (2013.01); *H04N 21/6125* (2013.01)

(58) Field of Classification Search
CPC .... H04N 21/65; H04N 21/6379; H04N 19/44; H04N 19/40; H04N 21/23424; H04N 21/23418; H04N 21/234345
See application file for complete search history.

(56) References Cited

U.S. PATENT DOCUMENTS

2015/0040169 A1* 2/2015 Hoffert
2016/0119572 A1* 4/2016 Slupik
2017/0220283 A1* 8/2017 Zhang
(Continued)

*Primary Examiner* — Tonia L Dollinger
*Assistant Examiner* — Linh T. Nguyen
(74) *Attorney, Agent, or Firm* — Fletcher Yoder, P.C.

(57) ABSTRACT

Systems and methods for switching from a linearly distributed live content and/or internet stream to other contents are provided by aligning timing between contents. Break points may be programmed between diverse non-time synced source encoder of the respective contents to facilitate switching between contents. A first linear stream is caused to be provided. A switchover time to a second linear stream is then identified. The second linear stream is caused to be provided at the switchover time. In different embodiments, switching may occur between different number of contents using the described systems and methods. One or more streaming contents may be up-converted and/or down-converted in different streaming systems.

20 Claims, 18 Drawing Sheets

(51) Int. Cl.
*H04N 21/61* (2011.01)
*H04L 65/80* (2022.01)

(56) References Cited

U.S. PATENT DOCUMENTS

2018/0035137 A1* 2/2018 Chen
2021/0021879 A1  1/2021 Fining et al.

* cited by examiner

SYSTEMS AND METHODS FOR LOCALIZED ADAPTIVE CONTENT DISTRIBUTION

CROSS REFERENCE TO RELATED APPLICATIONS

This application claims benefit of U.S. Provisional Patent Application No. 63/046,277, entitled "Systems and Methods for Adaptive Content Distribution," filed on Jun. 30, 2020, and which is herein incorporated by reference in its entirety for all purposes.

BACKGROUND

The present disclosure relates generally to the field of streaming content delivery, and more particularly to systems and methods for switching between broadcasting content streams displayed on media viewing devices, such as Over-the-Top (OTT) devices. OTT devices may be devices that receive content over the Internet rather than through traditional cable, broadcast, and/or satellite channels.

Various consumer media viewing devices, such as televisions, computers, and handheld devices (e.g., cellular telephones, audio and video players, gaming systems, and so forth) are configured to display content received from one or more content providers. Technology improvements in the field of content capture and delivery have resulted in a variety of new content formats that improve content quality and/or content delivery. For example, with the advent of HDR (e.g., high dynamic range) content, consumers may experience a wider range of luminance, with more detailed light and dark picture elements (e.g., contrast) than SDR (standard dynamic range) content. Typical HDR content may include a high level of contrast between light and dark images (e.g., large brightness range). Accordingly, HDR content may include imagery that more closely resembles colors and brightness visualized in real life, thereby providing consumers with a more realistic viewing experience. Further, a variety of resolution formats, such as SD (standard definition), HD (high definition), and UHD (ultra-high definition) have been developed to provide digital content in a wide variety of formats that can be used in various use cases.

A variety of frame rates may be used to conform to the original source content, improve the viewer experience for high motion content (e.g., 60 fps for sports, dance, etc.), and/or preserve the original artistic intent of the production (e.g., 24 fps for film). Furthermore, internationally produced content may be originated at different frame rates (e.g. 25 or 50 fps) that requires a costly standards conversion process to enable delivery via traditional North American delivery systems.

However, in certain situations, content distribution chains including network affiliate content distributors may not flexibly support certain formats (e.g., HDR and/or UHD) content. Accordingly, conventional content distribution chains may utilize various techniques to adapt HDR and/or UHD content provided by the digital content providers for the consumer's media viewing devices and displays, oftentimes resulting in reduced quality of digital content for a given content distribution channel. For example, content may be captured in an HDR format, with a desirable brightness and color range that may be rendered via the consumer's media viewing device. However, due to constraints within a conventional content delivery chain, the content distribution channel may only support a lower quality of distribution (e.g., SDR). Accordingly, the content distribution infrastructure may down-convert the quality of linear broadcasting streams (e.g., reducing the digital content to SDR and/or a lower-resolution format), thereby resulting in reduced brightness and/or color range and/or resolution and/or frame rate reduction of the content on the consumer's media viewing devices.

Further, in certain situations, existing content distribution chains may be expensive and/or time consuming to upgrade, thereby demanding practical solutions for provision of higher-quality broadcasting streams to the consumer's media viewing devices, when available. Systems and methods for providing a format agnostic content distribution flow may enable content distribution channels to support a wide variety of content formats. In some instances, a single content distribution channel may be caused to switch away from content streams sourced by the traditional content distribution chains towards alternative content streams sourced from an alternative source, supporting additional formats of content. This may reduce the amount of down-converted content in distribution chains experienced by end users. Thus, higher-quality content (e.g., HDR, UHD) without down-conversion may be provided for display on the consumer's media viewing device, via switching from the traditional content distribution chain.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In one embodiment, a method is provided. The method may enable switching between multiple broadcasting streams. The method may include providing a first live broadcasting stream of a first content stream origination source to a playback device for playback by the playback device via a communication network. Moreover, the method may include providing a second live broadcasting stream of a second content stream origination source to the playback device via the communication network. Furthermore, the method may include providing a switchover marker to the playback device indicating to the playback device a switchover time to switch playback to the second live broadcasting stream in lieu of playback of the first live broadcasting stream by a rules engine. The switchover marker may be associated with the first live broadcasting stream, the second live broadcasting stream of the second content stream origination source, or both. Also, the rules engine may provide the switchover marker based on a scheduling rule associated with availability of the first live broadcasting stream, the second live broadcasting stream, or both.

In another embodiment, a content distribution system is described. The system may include a network operations center. The network operation center may provide a first version of a live broadcasting stream with a first streaming format and a second version of the live broadcasting stream with a second streaming format. The system may also include a rules engine. The rules engine may receive the first and the second versions of the live broadcasting stream. The rules engine may decode the first and the second versions of the live broadcasting stream. Moreover, the rules engine may provide the decoded first version of the live broadcasting stream to an affiliate station to enable a video data switch of the affiliate station to cause provision of an affiliate stream by setting a packet timing of the affiliate stream based on the decoded version of the live broadcasting stream. Furthermore, the rules engine may receive the affiliate stream from the video data switch, up-convert the affiliate stream to the second streaming format, and generate a manifest. The manifest may enable switching between the up-converted affiliate stream and the second version of the live broadcasting stream based on the set packet timing of the affiliate stream, a packet timing of the decoded second version of the live broadcasting stream, or both.

In yet another embodiment, a method is described. The method includes using the rules engine to receive a first version of a live broadcasting stream having a first streaming format and a second version of the live broadcasting stream having a second streaming format from the network operation center. The rules engine may decode the first and the second versions of the live broadcasting stream. Moreover, the rules engine may provide the decoded first version of the live broadcasting stream to a downlink station. Furthermore, the rules engine may receive a downlink stream from the downlink station with set packet timings in response to providing the decoded first version of the live broadcasting stream.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
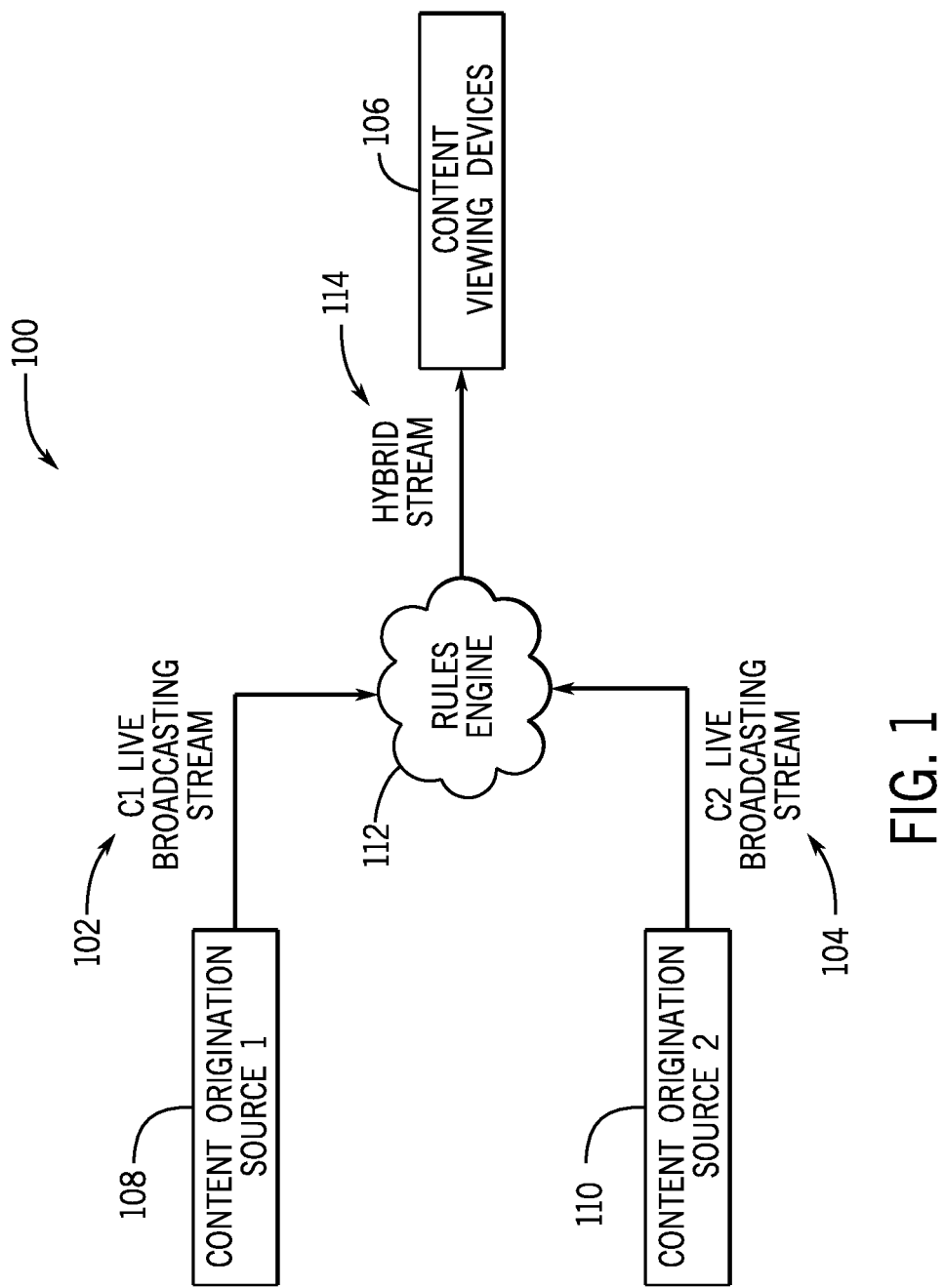
FIG. 1 is a schematic representation of an exemplary streaming system that selectively causes provision of one of multiple content streams via content stream switching, in accordance with aspects of the present embodiments.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As mentioned above, linear content distribution techniques oftentimes involves transmitting content using a certain weakest-link of formatting that can be provided by entities in the linear content distribution chain. In other words, the streaming format, such as resolution, color/brightness range, and/or frame rate, of resultant content provided to a content viewing device may be dependent upon the lowest streaming format quality supported by entities throughout the linear content distribution chain, from a content origination source to the content viewing device. Indeed, linear content distribution techniques may impose certain limitations on the resolution and/or frame rate of the streamed content.

Accordingly, in linear content distribution techniques, pre-recorded video signal content or live video signal content is broadcast in or down-converted to a certain streaming format (e.g., resolution and frame rate), throughout the linear content distribution chain. The default resolution and/or frame rate may be imposed to the linear content distribution chain by the maximum resolution and/or frame rate of an infrastructure with the lowest resolution and/or frame rate in the linear content distribution chain.

In some embodiments, a default resolution and frame rate may be limited and imposed to the broadcast infrastructure of affiliate content distributors. By way of example, live content may be produced using an UHD resolution, among other video resolutions, and the UHD live contents may be down-converted and transmitted using HD video quality in a linear content distribution method for compatibility with the infrastructure used in the linear content distribution chain.

Embodiments of the present disclosure generally relate to new content distribution techniques to reduce necessitated content down-conversion of high quality broadcasting streams (e.g., streaming content), through a linear content distribution chain. In some embodiments, the provision of content also includes up-converting other broadcasting streams with lower quality streaming format. The content distribution techniques described herein may cause provision of high quality broadcasting streams with their original production resolution and/or frame rate and in some cases, may provide up-converted broadcasting streams of lower quality streaming content.

The linear broadcasting streams described herein, may include one or more pieces of streaming content that are scheduled for and delivered at a particular time by a broadcaster. In embodiments described herein, such linear broadcasting streams may be referred to as hybrid streams. Moreover, such hybrid streams may include near real-time streaming content with respect to the capture of live content and/or pre-recorded content that is being broadcasted from a distribution center. The near real-time content and/or pre-recorded content that is being broadcasted from a distribution center may be referred to as the live content hereafter. The techniques described herein may cause provision of the live content with different streaming formats (e.g., resolutions, color/brightness ranges and/or frame rates), including UHD format. Particularly, the linear content distribution techniques described hereafter may facilitate provision of live broadcasting streams and other program feeds using a highest available content quality format while reducing down-conversion of high quality broadcasting streams.

In some embodiments, the linear content distribution techniques may use a rules engine to cause dynamic switching between the different broadcasting streams (e.g., streaming content) on the hybrid stream received by a device (e.g., an OTT device or an Adaptive Integrated Receiver Decoder (IRD)). For example, the rules engine may receive scheduling rules and/or manifest files including such scheduling rules associated with different streaming content and generate a merged manifest file that provides switchover indications used to command switching between content streams. As mentioned above, an OTT device is a device that receives content via the Internet rather than through traditional broadcast channels. Adaptive IRD devices are devices that receive a signal and convert digital information transmitted in the signal.

FIG. 1 depicts an embodiment of the present disclosure in which a streaming system 100 provides a hybrid stream 114 to a content viewing device 106. The streaming system 100 may include a rules engine 112 to facilitate provision of the hybrid stream 114. The hybrid stream 114 may include portions of a first live broadcasting stream 102, portions of a second live broadcasting stream 104, and switchover markers indicative of dynamic switching times (or points) between the first live broadcasting stream 102 and the second live broadcasting stream 104. In specific embodiments, the rules engine 112 may provide the hybrid stream 114 using multiple streaming formats (e.g., resolutions, color/brightness ranges and/or frame rates) including the maximum resolution and/or frame rate of the live broadcasting stream with the highest resolution and/or frame rate in the streaming system 100 (i.e., the first live broadcasting stream 102 or the second live broadcasting stream 104).

The first live broadcasting stream 102 may be sourced at a first content origination source 108 and the second live broadcasting stream 104 may be sourced at a second content origination source 110. In one embodiment, the first content origination source 108 may be an affiliate content distributor and the second content origination source 110 may be a network operation center (NOC). The NOC may include a centralized operation center that receives one or more streaming content (e.g., livestreaming content) directly or indirectly from the respective content producers. The NOC may process and provide such streaming content to downstream network operators, such as affiliate content distributors for content delivery.

In different embodiments, the first content origination source 108 and the second content origination source 110 may be a single NOC or different NOCs. When the first content origination source 108 and the second content origination source 110 are NOCs, the streaming system 100 may transmit the hybrid stream 114 to other streaming systems and/or multiple affiliate content distributors for provision to content viewing devices or further manipulation, as will be appreciated.

In the depicted embodiment, the rules engine 112 is communicatively coupled to the first content origination source 108 and the second content origination source 110. However, in some embodiments, the rules engine 112 may cause switching between the broadcasting streams used in the hybrid stream 114 without being communicatively coupled with the respective content origination sources. Moreover, in different embodiments, the rules engine 112 may enable dynamic switching between the first live broadcasting stream 102, the second live broadcasting stream 104, and other broadcasting streams sourced at other content stream origination sources to provide the hybrid stream 114. Additionally or alternatively, the rules engine 112 may enable dynamic switching between multiple resolutions and frame rates associated with each broadcasting stream. As such, the rules engine 112 may facilitate provision of the hybrid stream 114 to one or more content viewing devices, such as the content viewing device 106.

With the foregoing in mind, the first content origination source 108 may provide the first live broadcasting stream 102 (e.g., live stream, pre-recorded content, etc.) using a different video resolution and frame rate than the second live broadcasting stream 104 (e.g., live stream) provided by the second content origination source 110. For example, the second live broadcasting stream 104 may include a streaming format with higher quality (e.g., UHD content format) while the first live broadcasting stream 102 may include lower quality streaming format (e.g., 1080i resolution/29.97 frame rate).

In some embodiments, the rules engine 112 may provide the hybrid stream 114 using the higher quality streaming format, among other streaming formats. Accordingly, the rules engine 112 (or components associated with the rules engine 112) may up-convert the video resolution and frame rate of the first live broadcasting stream 102 to the video resolution and frame rate used by the second live broadcasting stream 104. Moreover, the rules engine 112 may cause provision of the hybrid stream 114 to the content viewing device 106 using highest available streaming quality as well as the original streaming quality. In some embodiments, the rules engine 112 may also cause provision of the hybrid stream 114 to the content viewing device 106 using other streaming qualities.

Furthermore, the rules engine 112 may enable dynamic switching between multiple live broadcasting streams sourced at multiple content stream origination sources, such as the first live broadcasting stream 102 and the second live broadcasting stream 104. As may be appreciated, dynamically switching between multiple broadcasting streams may cause provision of the hybrid stream 114 that provides streaming content from a variety of sources to the content viewing device 106 using the highest available streaming quality. The hybrid stream 114 may include one or multiple broadcasting streams provided in various streaming formats (e.g., resolutions, color/brightness ranges, and/or frame rates) such as 30 Hz, 60 Hz, 120 Hz, SDR, HDR, 1080i, 1080p, and/or 4K. The content in the hybrid stream 114 may include "live" content that is captured in near-real-time with respect to delivery and/or may include "non-live" content, such as content that is pre-recorded prior to delivery.

The rules engine 112 may identify one or more switchover times, indicated by received switchover markers, that may be utilized to dynamically switch between the multiple broadcasting streams, such as the first live broadcasting stream 102 and the second live broadcasting stream 104. The rules engine 112 may provide switchover markers to cause switchover between the content streams. For example, the second live broadcasting stream 104 may include switchover markers to indicate a switchover time associated with the second live broadcasting stream 104. The switchover markers may refer to markers that enable switching between channels or between content formats. As a non-limiting example, switchover markers may refer to SCTE markers (also known as a SCTE indicator or SCTE trigger), each of which may refer to a SCTE-35 trigger or a SCTE-104 trigger.

The rules engine 112 may receive the switchover markers associated with the broadcasting streams and may provide the hybrid stream 114 with similar or different switchover markers (e.g., SCTE-35 indicators) to the content viewing devices 106, based on the received switchover markers. That said, the rules engine 112 may receive the switchover markers with the first live broadcasting stream 102 to switch to or switch away from the first live broadcasting stream 102 or receive the switchover markers with the second live broadcasting stream 104 to switch to or switch away from the second live broadcasting stream 104, as will be appreciated.

For example, the rules engine 112 may utilize the received switchover markers to synchronize an end to provision of the first live broadcasting stream 102 to a beginning of provision of the second live broadcasting stream 104. In specific embodiments, the rules engine 112 may utilize the received switchover markers based on smallest segments of each broadcasting stream. In the depicted embodiment, the rules engine 112 may cause switching between the first live broadcasting stream 102 and the second live broadcasting stream 104 by providing the hybrid stream 114 including such switchover markers.

Moreover, the rules engine 112 may use the switchover markers to cause provision of the hybrid stream 114 including content with different streaming formats (e.g., HD, UHD, etc.) to the content viewing device 106. For example, the rules engine 112 may utilize the switchover markers to synchronize switching between different streaming formats of the first live broadcasting stream 102 and different streaming formats of the second live broadcasting stream 104. The switchover markers may indicate a switchover time for simultaneously switching between different streaming contents as well as various streaming formats of each streaming content.

In some embodiments, the live broadcasting streams, such as the first live broadcasting stream 102 and the second live broadcasting stream 104 may include live content. As described above, the live content may refer to streaming content captured in real-time or near real-time with respect to the capture of live content and/or pre-recorded content that is being broadcasted from a distribution center. In other embodiments, the live broadcasting streams may include pre-recorded content that is broadcast by the one or more NOCs. Although FIG. 1 and subsequent figures may be discussed with respect to live streams, live streams are meant to be an example and not a limitation. In this disclosure, any reference to live streams, may alternatively apply to non-live streams such as video-on-demand and other pre-recorded sources.

As mentioned above, in different embodiments, the rules engine 112 may receive the live broadcasting streams from the one or more NOCs. In such embodiments, the rules engine 112 may provide the hybrid stream 114 to other rules engines and/or multiple affiliate content distributors. For example, each affiliate content distributor may receive the hybrid stream 114 and integrate local content for provision with the hybrid stream 114 to content viewing devices 106. Such local content may be specific to each affiliate content distributor. For example, the local content may include advertisements, local weather information, local news, subtitles, etc. In such embodiments, the hybrid stream 114 may include the live broadcasting streams, received from the one or more NOCs, as well as respective switchover markers.

Moreover, in such embodiments, the switchover markers included with the hybrid stream 114 may indicate switching times between the received live broadcasting streams from the one or more NOCs. The switching markers may also indicate switching times to other streaming content that may be provided by each respective affiliate content distributor. That is, because the live broadcasting streams are received from respective NOCs, the rules engine 112 may provide the hybrid stream 114 with switching markers between the live broadcasting streams as well as switching markers for switching to other content (e.g., advertisement, local news, etc.) that may be provided by each of the affiliate content distributors.

Upon receiving the hybrid stream 114, similar or different rules engines (compared to the rules engine 112) may be used by each of the affiliate content distributors to integrate local streaming content with the received hybrid stream 114 and provide the resulting streaming content to the content viewing devices 106. That said, in different embodiments, the rules engine 112 may receive and include different numbers of live broadcasting streams with the hybrid stream 114 to the respective affiliate content distributors.

Figure 2:
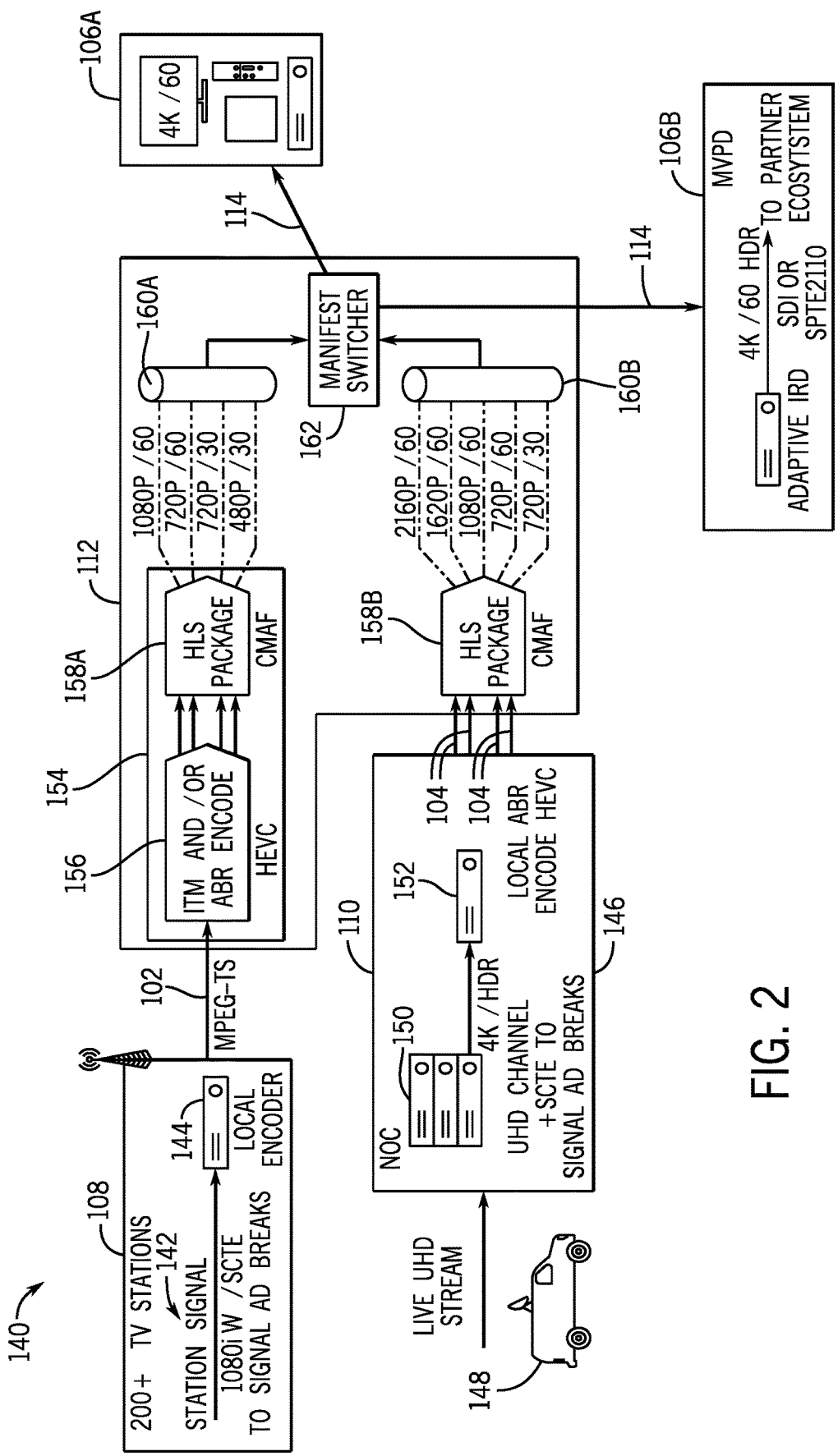
FIG. 2 is a schematic representation of an exemplary streaming system used by a first-level broadcaster and by second-level affiliates that causes provision of one of multiple content streams via content stream switching, in accordance with aspects of the present embodiments.

FIG. 2 depicts an embodiment of a streaming system 140 of FIG. 1, wherein the first content origination source 108 may include an affiliate content distributor, the second content origination source may include a NOC, and the rules engine 112 may provide the hybrid stream 114 to the content viewing devices 106. As such, the first content origination source 108 may provide the first live broadcasting stream 102 and the second content origination source 110 may provide the second live broadcasting stream 104. The first live broadcasting stream 102 and the second live broadcasting stream 104 may be provided, among other live broadcasting streams, to the rules engine 112.

As mentioned above, the first content origination source 108 may include, for example, an affiliate content distributor 142 for an upstream broadcaster, such as local television (TV) station. The affiliate content distributor 142 may provide a live broadcasting stream (e.g., live stream, pre-recorded content, etc.) using a video resolution and frame rate, such as 1080i/29.97. The first content origination source 108 may further include a local encoder 144 to encode the first live broadcasting stream 102. By the way of example, the local encoder 144 may encode the first live content stream with desired coding parameters, and transmit the encoded content using a streaming container format, for example, the Moving Picture Experts Group Transport Stream (MPEG-TS) format.

A UHD content source 148 may provide live content in UHD format to the second content origination source 110. The UHD content source 148 may capture the live content and provide the captured live content to the second content origination source 110 in near real-time. The second content origination source 110 may be a NOC 146 or other content origination source. The NOC 146 may include, for example, a UHD channel 150 and a local encoder 152. The UHD channel 150 may modify the received live content and/or other content. For example, the UHD channel 150 may insert advertisements, signaling metadata (e.g. SCTE-35), and subtitles for provision in an UHD format.

The UHD channel 150 may also cause provision of the live content to the local encoder 152. The local encoder 152 may encode the live content provided by the UHD channel 150, according to a standard video compression encoding scheme, such as High Efficiency Video Coding (HEVC) video compression standard. Moreover, the local encoder 152 may transmit the encoded live content as the second live broadcasting stream 104 using a streaming container format, such as the MPEG-TS format.

In specific embodiments, the local encoder 152 may use a streaming method, such as adaptive bitrate streaming (ABR), to encode and provide the UHD channel 150 provided live content at multiple bit rates over hypertext transfer protocol (HTTP) application protocol. That is, the second live broadcasting stream 104 may be transmitted at multiple resolutions and frame rates such as 2160p/60 Hz, 1080p/60 Hz, 720p/60 Hz and/or 720p/30 Hz. Accordingly, the local encoder 152 may transmit the encoded live broadcasting stream 104 in UHD, 4K, HDR and/or other video formats. The local encoder 152 may further transmit switchover markers signaling a switchover (e.g., SCTE markers such as SCTE-35 indicators) to or from the second live broadcasting stream 104. In different embodiments, the local encoder 152 may transmit the switchover markers in a manifest file associated with the second live broadcasting stream 104 or in the raw broadcasting stream (the second live broadcasting stream 104).

A manifest file may include switchover markers to indicate segments of the received live contents. Moreover, the switchover markers may indicate a switching time between the first live broadcasting stream 102 and the second live broadcasting stream 104, among other broadcasting streams, to be provided to the content viewing device 106. Nevertheless, the switchover markers may adhere to standards and/or protocols understood by downstream systems and/or devices. For example, live content embedded in an HTTP Live Streaming (HLS) protocol manifest, such as Society of Cable Telecommunications Engineers (SCTE) SCTE-35 standard, may use the switchover markers to allow timely switching of the embedded live content to other live content or types of content.

In some embodiments, the switchover markers may be implemented using discontinuity tags in an HLS protocol. In some other embodiments, the switchover marker may be implemented using periods in a Dynamic Adaptive Streaming over HTTP (DASH) adaptive bitrate streaming. Different content encoding or content embedding techniques may be used to facilitate the use of switchover markers in different embodiments.

A SCTE-35 standard cue may be used for inserting inline cues in streams. The SCTE-35 is typically used as digital program insertion cueing message for the affiliate content distributors, such as for advertisement insertion. In an aspect, the switchover markers (e.g., SCTE-35 or SCTE-104) may be modified to include other indications, such as decoding parameters, video format and/or bitrate change indication that will enable a manifest switcher 162 to know not only when to switch from the first live broadcasting stream 102 to the second linear broadcast stream, but also the decoding parameters, video format, and/or bitrate change information that are needed to switch to the second live broadcasting stream 104.

In some embodiments, the manifest switcher 162 may receive the switchover markers from different manifest files associated with different streaming content and generate a merged manifest file. As such, the manifest switcher 162 may facilitate switching between different streaming content and/or different formats of each streaming content based on receiving the switchover markers associated with different streaming content, as will be appreciated. Moreover, although operations of the manifest switcher 162 is described with respect to the depicted embodiments, it should be appreciated that the rules engine 112 may perform similar or different operations to facilitate provision of the hybrid stream 114 in different embodiments.

The rules engine 112 may cause provision of a live broadcasting stream, such as the first live broadcasting stream 102 or the second live broadcasting stream 104, to one or multiple content viewing devices, such as the content viewing devices 106, through the hybrid stream 114. In different embodiments, cloud computing devices or physical computing devices positioned at an edge of the affiliate content distributors, before transmission of the output content to the various content viewing devices, may include the rules engine 112. The edge devices may take the form of hardware computers. For example, the rules engine 112 may utilize processing circuitry, Random Access Memory devices (RAM), memory systems, display devices, connectors, Input/Output (I/O) ports, non-transitory computer readable memory (e.g., software, etc.), among other things, to cause provision of the hybrid stream 114.

With the foregoing in mind, the rules engine 112 may utilize various methods and/or circuitry to identify switchover markers of received live broadcasting streams and provide the merged manifest files to cause dynamic switching between the different received live broadcasting streams. In the depicted embodiment, the rules engine 112 may identify the received switchover markers of the first live broadcasting stream 102 and the second live broadcasting stream 104 (e.g., SCTE-104 markers) to provide such merged manifest file with respective switchover indicators (e.g., SCTE-35 or SCTE-104 markers). The use of two live broadcasting streams is an example and different number of live broadcasting streams may be used in different embodiments. For example, the merged manifest file may indicate switching among 3, 4, 5, 6, or a greater number of streams. The dynamic switching between multiple live broadcasting streams may cause provision of the hybrid stream 114 content to a content viewing device 106A and/or a content viewing device 106B.

Having discussed the provision of the first live broadcasting stream 102 and the second live broadcasting stream 104, the discussion now turns to downstream processing of the first and second live broadcasting streams 102 and 104. An encoding and packaging block 154 of the rules engine 112 (or other downstream services) may receive the first live broadcasting stream 102. Moreover, the encoding and packaging block 154 may include an encoding unit 156 and a packaging unit 158A. In certain embodiments, the encoding unit 156 may receive the first live broadcasting stream 102, encode the received live broadcasting stream 102 according to one or multiple encoding schemes, and transmit the encoded live content to the packaging unit 158A.

In some embodiments, the encoding unit 156 may up-convert the first live broadcasting stream 102 to support desired output characteristics such as HDR. For example, the encoding unit 156 may encode the received live content according to a standard video encoding scheme such as HEVC and/or use Inverse Tone Mapping (ITM) to up-convert SDR content to HDR content. The encoding unit 156 may further use an Adaptive Bitrate Streaming (ABR) streaming method to enable transmission of the first live broadcasting stream 102 at multiple resolutions and frame rates. Moreover, the encoding unit 156 may propagate a manifest file including switchover markers for transmission with the encoded live content. The encoding unit 156 may utilize various formats (e.g., resolutions, color/brightness ranges, and/or frame rates) for transmitting the received first live broadcasting stream 102 such as 2160p/60, 1080p/60 Hz, 720p/60 Hz, 720p/30 Hz, and/or 480p/30 Hz over HTTP application protocol.

The packaging unit 158A may receive the encoded live content (at multiple resolutions and frame rates) and may package the received live content according to a communication protocol, such as HLS or dynamic adaptive streaming over HTTP (DASH). The packaging unit 158A may use the received switchover markers (received with the raw broadcasting stream or the respective manifest file) with the first live broadcasting stream 102 to cause provision of the hybrid stream 114. In some embodiments, when the switchover markers are received with the first live broadcasting stream 102 (raw broadcasting stream), the packaging unit 158A may generate a respective manifest file based on the received switchover markers. Furthermore, the packaging unit 158A may transmit the packaged live content and/or segments of the packaged live content according to a standard reference model for media delivery, such as Common Media Application Format (CMAF). Accordingly, the encoding and packaging block 154 may provide the encoded and packaged live content and the respective manifest file to a cache or other storage 160A.

The rules engine 112 (or other downstream services) may receive and package the second live broadcasting stream 104 in parallel to the operations on the first live broadcasting stream 102. In certain embodiments, the second live broadcasting stream 104 may be encoded before transmission to the rules engine 112 and may include a manifest file. The rules engine 112 may utilize the packaging unit 158B to receive the second live broadcasting stream 104 (e.g., encoded live content at multiple resolutions and frame rates). The packaging unit 158B may package the received live content according to a communication protocol, such as HLS or DASH adaptive bitrate streaming.

The packaging unit 158B may use the received switchover markers (received with the raw broadcasting stream or the respective manifest file) with the second live broadcasting stream 104 to cause provision of the hybrid stream 114. In some embodiments, similar to the operations of the packaging unit 158A described above, the packaging unit 158B may generate a respective manifest file based on the received switchover markers when the switchover markers are received with the second live broadcasting stream 104 (raw broadcasting stream). Moreover, the packaging unit 158B may transmit the packaged and/or segmented live content according to a standard reference model for media delivery, such as CMAF. The packaging unit 158B may provide the encoded and packaged live content and the respective manifest file to cache or other storage 160B.

Accordingly, the manifest switcher 162 may receive the respective manifest files of the first live broadcasting stream 102 and the second live broadcasting stream 104 and may generate and provide the merged manifest file. The rules engine 112 may then cause provision of the hybrid stream 114 using the merged manifest file that may provide an indication of switchover events between the packaged live content streams.

That said, the switchover markers may include SCTE messages or other messages/indicators that provide timings associated with the live content streams. The respective manifest files of the live broadcasting streams, such as the first live broadcasting stream 102 and the second live broadcasting stream 104, may be received in order to generate the merged manifest file. The timings and switchover markers from the received manifest files may be combined to generate the merged manifest file. In some embodiments, the manifest switcher 162 may receive the packaged live content with the respective manifest files to generate and provide the merged manifest file, as will be appreciated.

In an aspect, in addition to timing information, the merged manifest file may include other indications, such as decoding parameters, video formats and/or a bit rate change indication that will enable the manifest switcher 162 (or a downstream device) to know not only when to switch between streams but also the decoding parameters, video format, and/or bitrate change information needed to switch to and render a different stream. For example, the merged manifest file may provide switchover indications between different resolutions and frame rates associated with the streams. Moreover, SCTE messages may include SCTE-35 and/or SCTE-104 standard markers to provide switchover times, between multiple live broadcasting streams, to OTT or adaptive IRD devices. Accordingly, the OTT device may appear as if it is pulling content from one stream of data, whereas it will actually switch between two content streams, each from a different source.

The merged manifest file may be used for alignment of switching times between streams at the switchover markers. The received manifest files may include the switchover markers, which may also be included in the merged manifest file. In some embodiments, the merged manifest file is provided to the content viewing devices 106 (e.g., transmitted via the hybrid stream 114 channel). In such embodiments, the merged manifest file may cause the content viewing devices 106 to switch between live content streams at particular times indicated by the switchover markers. As discussed above, in some embodiments, the manifest switcher 162 may create the merged manifest file and include the respective metadata (e.g., switchover markers) in the merged manifest file.

The merged manifest file and the metadata may also include the switchover markers and/or discontinuity tags that may facilitate alignment of switching times between streams at the switchover markers. Moreover, as discussed above, the streaming system 140 may provide the live broadcasting streams using different formats (e.g., different resolution, different color/brightness ranges, and/or frame rates). Accordingly, the manifest switcher 162 may facilitate dynamically switching between the live broadcasting streams and different formats of each of the live broadcasting stream according to the merged manifest file.

Thus, content of the hybrid stream 114 channel may include one or multiple live broadcasting streams transmitted with different formats of each of the live broadcasting streams (e.g., resolutions, color/brightness ranges, and/or frame rates), such as 1080i, 1080p, and/or 4K. Moreover, the content viewing devices 106 may be equipped with processing circuitry to receive the content of the hybrid streaming 114 channel and render the live broadcasting stream with the various formats. In some embodiments, the rules engine 112 may provide the merged manifest file to the content viewing devices 106, enabling the content viewing devices 106 to be notified of format changes in the content of the hybrid stream 114 channel to alter live content rendering in accordance with the merged manifest file.

In certain embodiments, the content viewing devices 106 may use an OTT device 106A for rendering of streaming content. The content viewing device 106B may be an IRD device that may cause provision of the hybrid stream 114 to a multichannel video programming distributor (MVPD). It should be noted that in certain embodiments, the content viewing device 106, such as the OTT device 106A and Adaptive IRD device 106B may decode, encode, and/or switch the segments between the various content origination sources to deliver the received hybrid streaming 114 content to one or multiple users or MVPDs. Furthermore, the OTT devices and IRD devices may utilize the manifest file to switch between various live contents and align timing between the various live contents to be provided to a user. Furthermore, in certain embodiments, an OTT device may be implemented in smart TV devices, or other viable content viewing devices (such as mobile devices, including mobile phones and tablets) and may automatically convert and provide the content received into a desired format (e.g., UHD and/or HDR).

In this manner, the content viewing devices 106 may receive, via a single distribution channel (e.g., one linear content distribution channel), streaming content in a variety of formats from multiple live broadcasting streams and sourced from multiple content origination sources. The described approach to live streaming content delivery to a content viewing device may allow provision of high quality live broadcasting streams without a need to down convert high quality live content. Therefore, the described systems and/or methods may facilitate for avoiding quality loss of produced live content with minimal to no manipulation of legacy infrastructure. That is, the described content delivery method may enable high-quality (e.g., 4K resolution and above) live streaming content delivery to the content viewing devices 106 when available, while not interrupting the traditional linear content delivery chain.

With the foregoing in mind, in different embodiments, the rules engine 112 may receive (e.g., input) a hybrid stream, similar to the hybrid stream 114, from the first content origination source 108, the second content origination source 110, or both. In one non-limiting example, the second live broadcasting stream 104 may include such hybrid stream. For example, a streaming system, similar to the streaming system 140, may reside in the second content origination source 110 to provide the hybrid stream to the rules engine 112. The hybrid stream may include multiple streaming contents associated with different channels (e.g., live broadcasting streams). For example, the multiple streaming contents of the second live broadcasting stream 104 may be sourced at one or more upstream sources (e.g., NOCs and/or affiliate content distributors) for delivery to multiple downstream media (e.g., affiliate content distributors).

In such embodiments, the streaming system 140 may provide the hybrid stream 114 including the multiple streaming contents of the second live broadcasting stream 104, as well as the streaming content of the first live broadcasting stream 102. In particular, the rules engine 112 may provide the hybrid stream 114 including the multiple streaming contents of the second live broadcasting stream 104, sourced at one or more upstream sources, as well as the streaming content of the first live broadcasting stream 102 to the content viewing devices 106. The rules engine 112 may provide the merged manifest file including the switching markers (e.g., SCTE-35 markers) of the multiple streaming contents sourced at one or more upstream sources associated with the second content origination source 110 and the first content origination source 108.

Figure 3A:
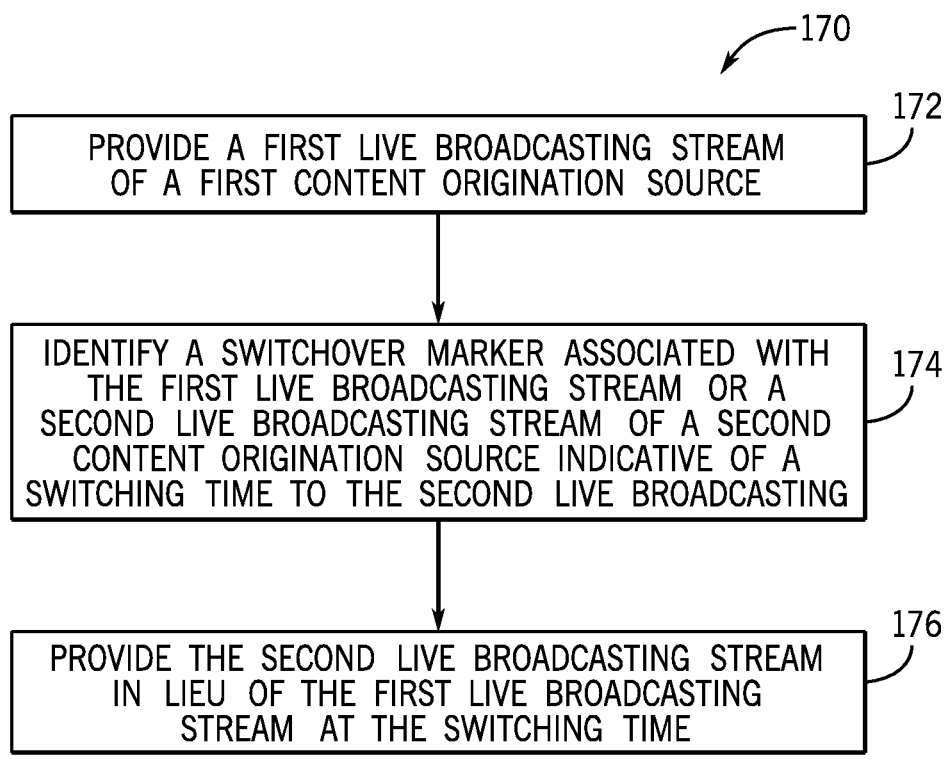
FIG. 3A is a flowchart of a process for switching between a first live broadcasting stream and a second live broadcasting stream, in accordance with aspects of the present embodiments.

FIG. 3A depicts an example process 170 of a streaming system, such as the streaming systems 100 or 140. In some embodiments, the rules engine 112 may perform the process 170. However, in different embodiments, any viable processing circuitry associated with a streaming system may perform the process 170. At block 172, the streaming system may provide a first live broadcasting stream 102 of a first content origination source 108 to a content viewing device (e.g., content viewing device 106).

At block 174, the streaming system may identify a switchover marker associated with the first live broadcasting stream 102 or a second live broadcasting stream 104 of the second content origination source 110 indicative of a switching time to the second live broadcasting stream 104. In one example, the first live broadcasting stream 102, described above, may include a switchover marker that causes switching away from the first live broadcasting stream 102. In a second example, the second live broadcasting stream 104, described above, may include a switchover marker that causes switching away from the first live broadcasting stream 102. Subsequently, at block 176, the streaming system may provide the second live broadcasting stream 104 in lieu of the first live broadcasting stream 102 at the switching time.

Figure 3B:
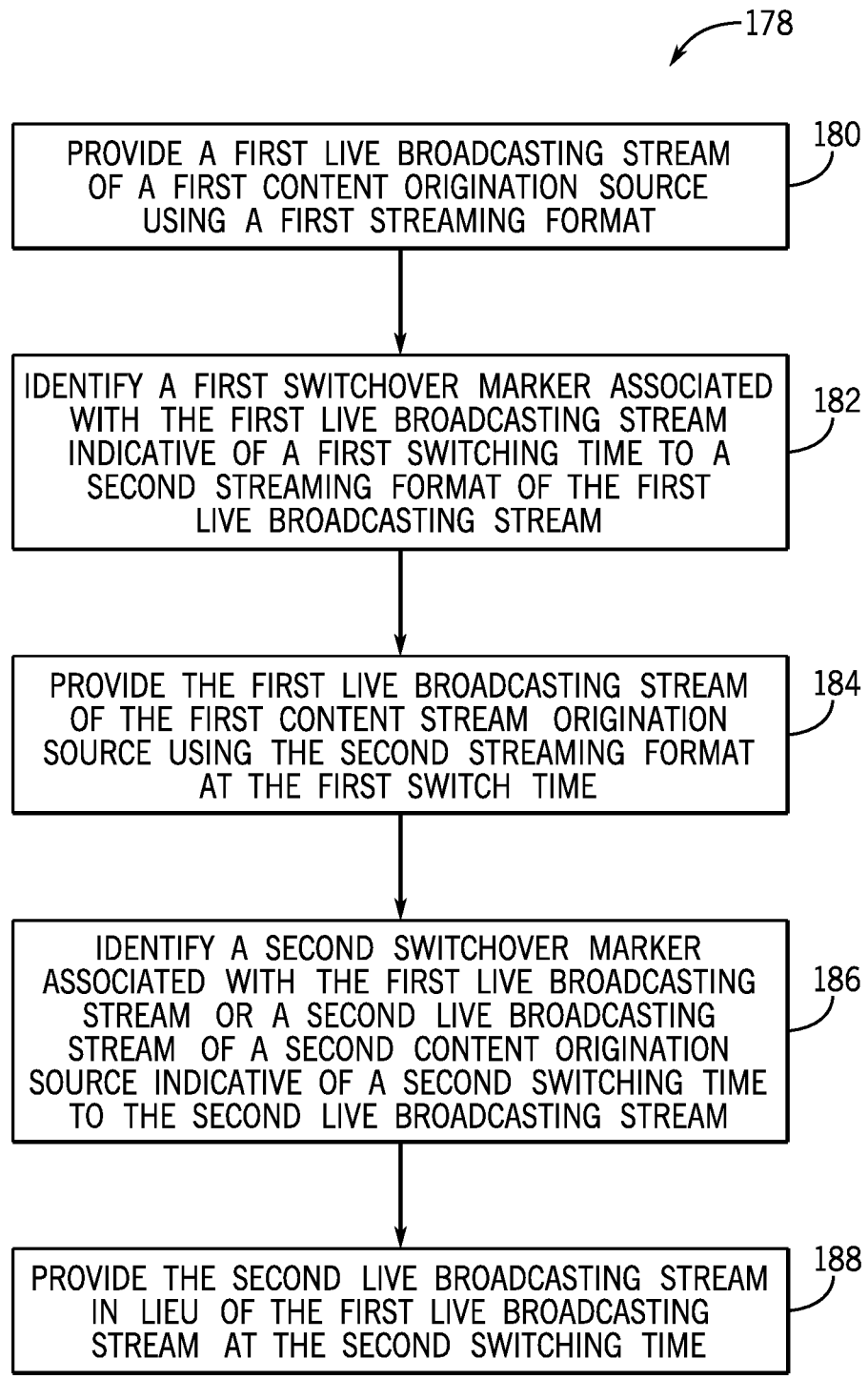
FIG. 3B is a flowchart of a process for switching between different broadcasting streams of a first live broadcasting stream and a second live broadcasting stream, in accordance with aspects of the present embodiments.

Referring now to FIG. 3B, a flowchart depicts an example process 178 of a streaming system, such as the streaming systems 100 or 140, when the first live broadcasting stream 102 includes multiple streaming contents (or a hybrid stream). As discussed above, the multiple streaming contents may be sourced at one or more upstream sources (e.g., NOCs and/or affiliate content distributors). Moreover, the first live broadcasting stream 102 may provide each of the multiple streaming contents using different resolutions and frame rates. For example, the first live broadcasting stream 102 may include the multiple streaming contents such as a first streaming content using HD quality and a second streaming content using UHD quality.

In some embodiments, an upstream rules engine, similar to the rules engine 112, may provide the first live broadcasting stream 102 including the multiple streaming contents with respective switchover markers. The switchover markers may be included with the raw streaming contents of the first live broadcasting stream 102 and/or included within a respective merged manifest file associated with the first live broadcasting stream 102.

The streaming system may also receive the second live broadcasting stream 104 with the respective switchover markers. By the way of example, at block 180, the streaming system may provide the first live broadcasting stream 102 of the first content origination source 108 using a first streaming format (e.g., resolution, bit rate, graphics, audio quality, etc.). At block 182, the streaming system may identify a first switchover marker of the first live broadcasting stream 102. The first switchover marker may indicate a first switching time to a second streaming format of the first live broadcasting stream 102. As such, at block 184, the streaming system may provide the first live broadcasting stream 102 using the second streaming format by one or multiple content viewing devices (e.g., content viewing devices 106) at the first switching time. Accordingly, the streaming system may also include the first switchover marker in the merged manifest file for downstream transmission with the hybrid stream 114.

Moreover, at block 186, the streaming system may identify a second switchover marker associated with the first live broadcasting stream 102 (e.g., to switch away) or the second live broadcasting stream 104 of a second content origination source 110 (e.g., for switching to) indicative of a second switching time to the second live broadcasting stream 104. As such, at block 188, the streaming system may provide the second live broadcasting stream 104 in lieu of the first live broadcasting stream at the second switching time by one or multiple content viewing devices (e.g., content viewing devices 106). Accordingly, the streaming system may also include the second switchover marker in the merged manifest file for downstream transmission with the hybrid stream 114. As such, the content viewing devices may switch away from the first streaming content of the second live broadcasting stream 104 at the second switching time and cause provision of the second streaming content of the second live broadcasting stream 104.

With the foregoing in mind, it should be appreciated the processes 170 and 178 are merely example embodiments and different process blocks may be used in different embodiments. Moreover, in different embodiments, the processes 170 and 178 may be performed in different orders. Furthermore, different number or type of switchover markers may be used in different embodiments.

That said, in some embodiments of the streaming system 140, the rules engine 112 (or the manifest switcher 162) may perform time synchronization between the switchover markers identified in different manifest files. The time synchronization process 190 depicted in the flowchart of FIG. 4, may be utilized by the streaming system 140 and the manifest switcher 162 to manage the time alignment of live and cached segments when switchover markers are received and identified as not matching by the manifest switcher 162.

At block 192, the process 190 may include identifying a first switchover marker associated with the first live broadcasting stream 102. In different embodiments, the first switchover marker may be received with raw streaming contents of the first live broadcasting stream 102 or in a first manifest file received with the first live broadcasting stream 102. The first switchover marker may indicate a first switchover time/switchover command to cause provision of the first live broadcasting stream 102 on the content viewing devices 106. The identified switchover marker may also indicate another switchover time to switch away from the first live broadcasting stream 102 to cause provision of the second live broadcasting stream 104.

In different embodiments, the first live broadcasting stream 102 and the second live broadcasting stream 104 may each include multiple streaming contents (e.g., multiple live broadcasting streams or a hybrid stream). One non-limiting example of such embodiments is described above with respect to the process 170 of FIG. 3. In a different example, the first live broadcasting stream 102 may include multiple streaming contents. Accordingly, the first switchover marker may indicate a first switchover time/switchover command to cause provision of one of the streaming contents of the first live broadcasting stream 102 on the content viewing devices 106. In specific embodiments, the identified switchover marker may also indicate another switchover time to switch away from the live broadcasting stream of the first live broadcasting stream 102 to cause provision of the second live broadcasting stream 104.

Figure 4:
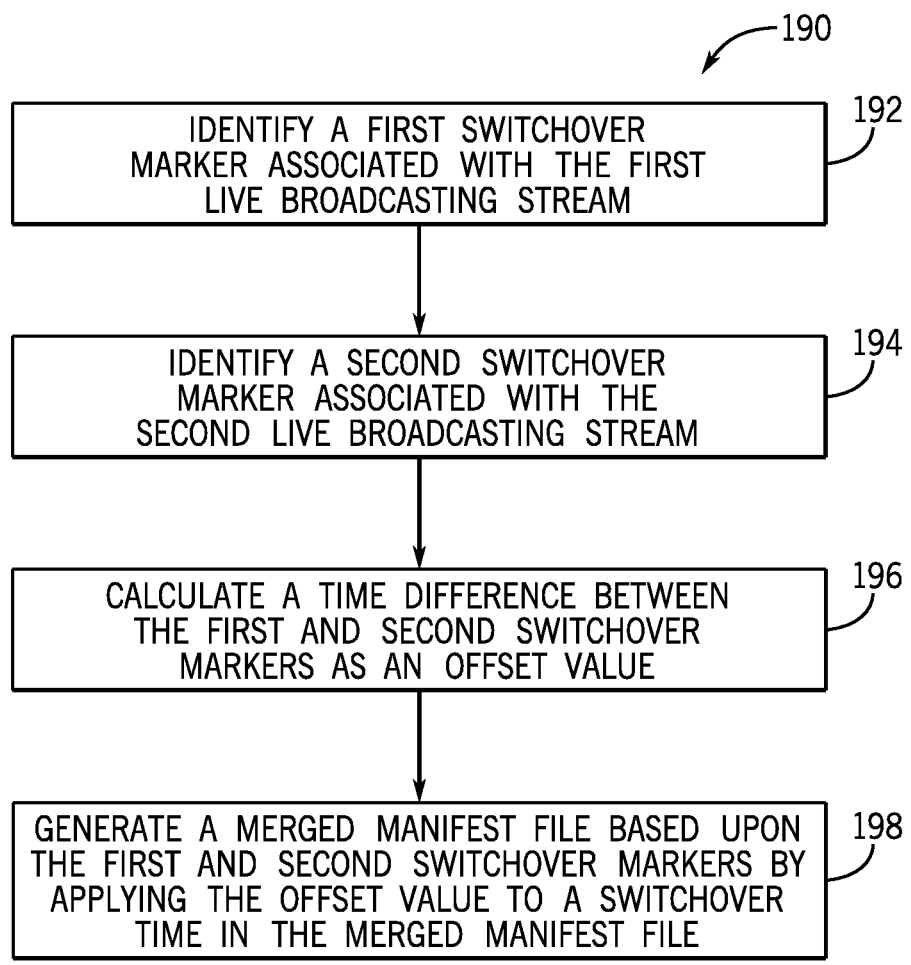
FIG. 4 is a flowchart of a process for synchronized switching of content streams for a particular broadcast channel displayed on the content viewing device, in accordance with aspects of the present embodiments.

Referring back to the embodiment of FIG. 4, at block 194, the manifest switcher 162 may identify a second switchover marker associated with the second live broadcasting stream 104. In different embodiments, the second switchover marker may be received with raw streaming contents of the second live broadcasting stream 104 or in a second manifest file received with the second live broadcasting stream 104. The second switchover marker may indicate a switchover time/switchover command to cause provision of the second live broadcasting stream 104 on the content viewing devices 106 at the switchover time and/or to switch away from provision of the second live broadcasting stream 104. In some instances, the reference time used to indicate the switchover times between the first switchover marker and the second switchover marker may not be synchronized.

In such situations, if not corrected, the first live broadcasting stream 102 may be switched to the second live broadcasting stream 104 prior to the beginning of streaming content to be rendered in the second live broadcasting stream 104. Accordingly, in block 196, the manifest switcher 162 may include calculating a time difference between the first and the second switchover markers as an offset value. The offset value may be utilized to compensate for a portion of the first or the second live broadcasting streams 102 and 104 that may otherwise be lost because of reference time skews between the first and second switchover markers.

Furthermore, at block 198, the process 190 may include generating the merged manifest file based upon the first and second switchover markers. The process 190 may also include applying the offset value to a switchover time in the merged manifest file. The merged manifest file may use the offset value, calculated at block 196, to cause a delay in provision of the second live broadcasting stream 104 respective to the second switchover marker received in the second manifest file. In certain embodiments, the merged manifest file of block 198 may utilize a buffer memory/cache to store and enable a delay in provision of the live broadcasting stream, based on the offset value.

Figure 5A:
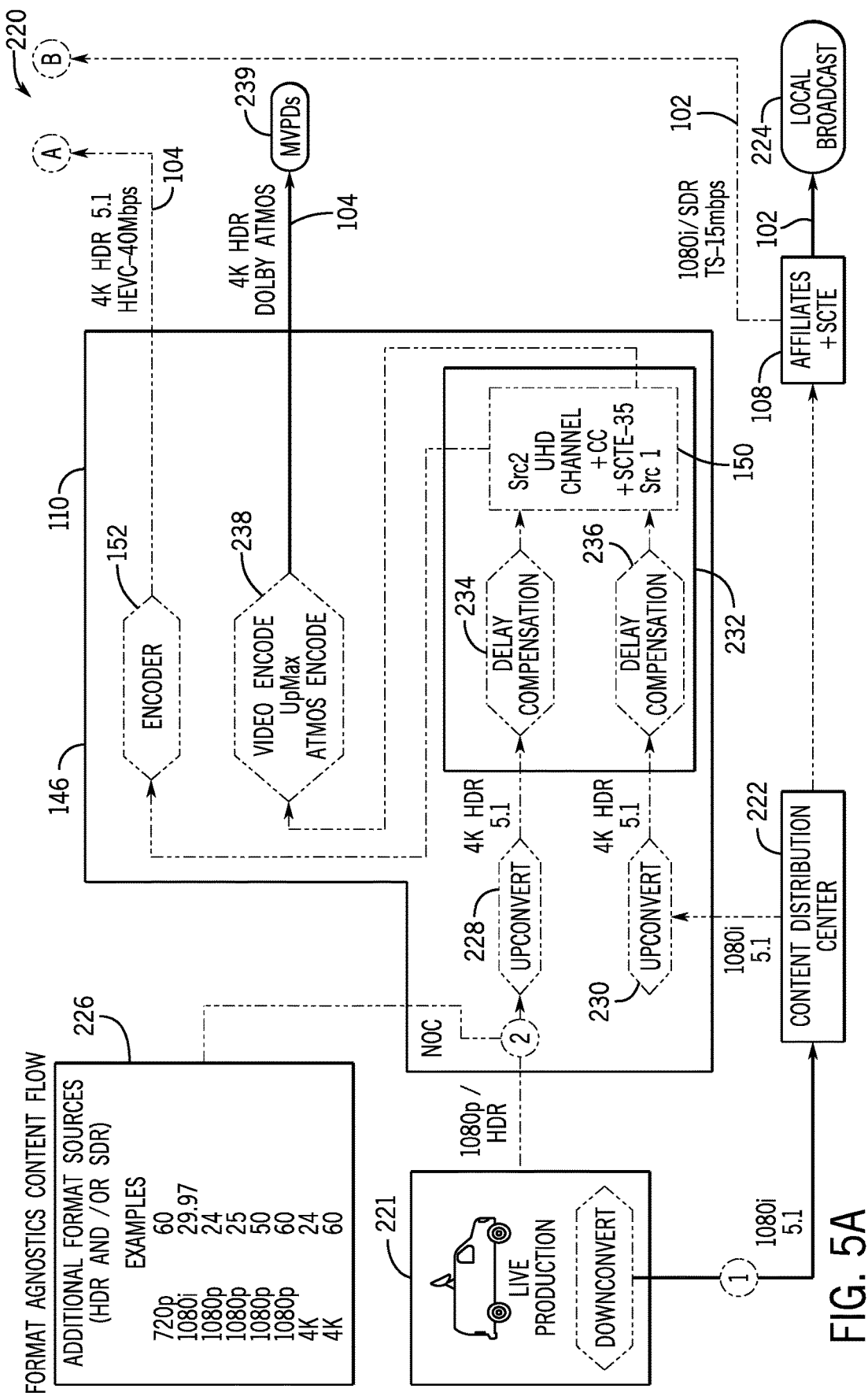
FIG. 5A is a schematic representation of packaging and encoding streaming content using an exemplary streaming system that causes provision of format-agnostic content via a broadcast channel that provides content for display on a content viewing device, in accordance with aspects of the present embodiments.
Figure 5B:
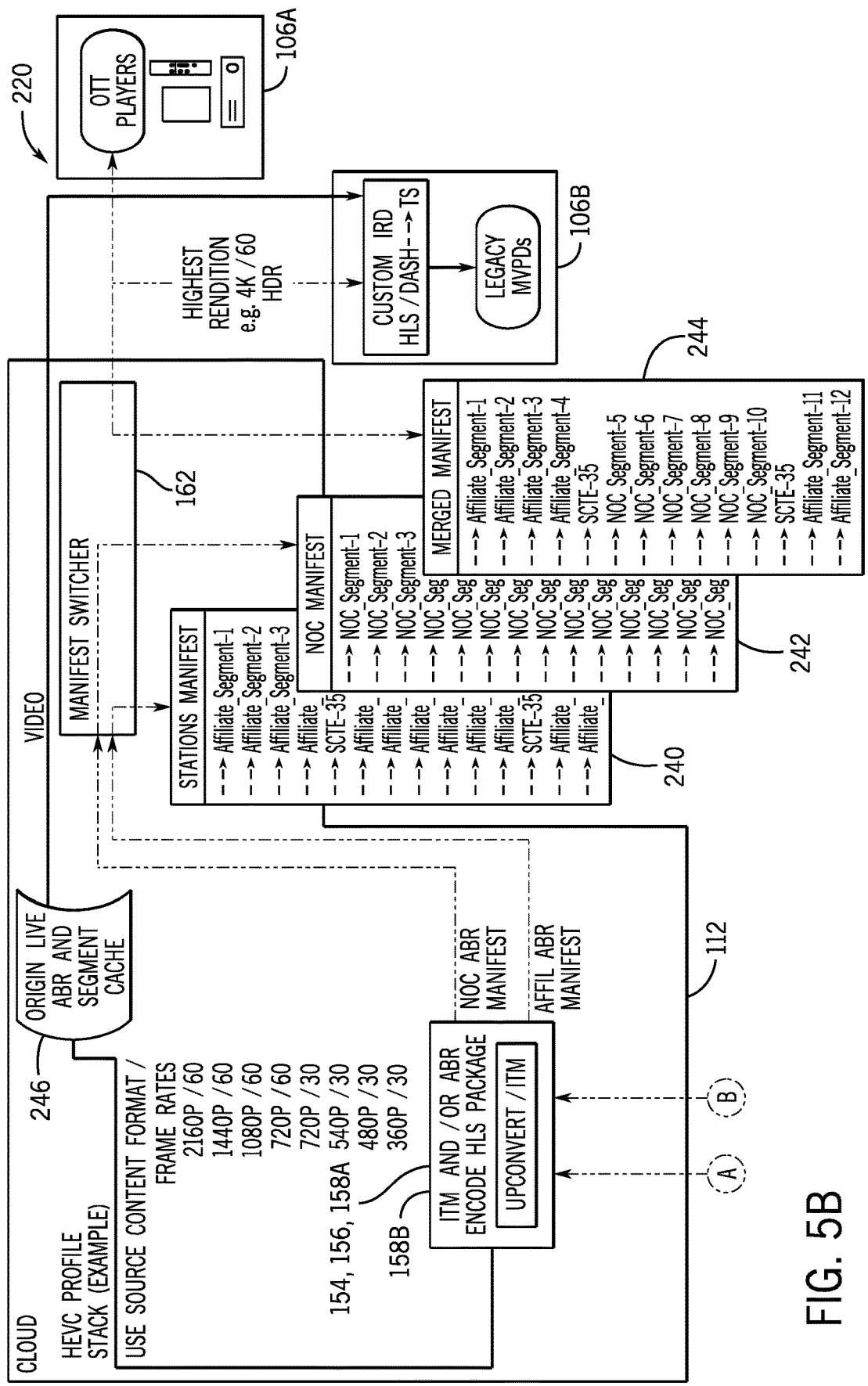
FIG. 5B is a schematic representation of an exemplary rules engine of the streaming system of FIG. 5A that causes provision of the format-agnostic content via the broadcast channel that provides content for display on the content viewing device, in accordance with aspects of the present embodiments.

FIG. 5A illustrates a streaming system 220, which uses a synchronized merged manifest file. Accordingly, a controlled delay of switchover between streams is implemented in the depicted embodiment. Moreover, although embodiments of FIGS. 5A and 5B are described with respect to switching between different streaming formats of the first live broadcasting stream 102 and the second live broadcasting stream 104, similar techniques may be used for switching between different streaming content that may be included in the first live broadcasting stream 102 or the second live broadcasting stream 104.

That said, the content source 221 may produce live streaming content for transmission and delivery to content viewing devices 106A and 106B. A first content delivery path may use the linear content distribution method for live content delivery, as will be appreciated. In certain embodiments, the content source 221 broadcasting stream may be up-converted (e.g., to 1080i or HDR resolution) before transmission to the NOC 146. However, when the broadcasting stream is produced using high streaming quality format (e.g., HDR), the content source 221 may transmit the broadcasting stream using original streaming format to the NOC 146.

Additionally, the content source 221 broadcasting stream may be down-converted (e.g., to 1080i or HDR resolution) before transmission to a content distribution center 222. By the way of example, the content distribution center 222 may be a distribution commercial integration center, such as a national distribution center. The content distribution center 222 may utilize a content distribution method such as, but not limited to, satellite content distribution systems to broadcast the live streaming content to the first content origination source 108. The first content origination source 108 may include local content distribution centers or affiliate content distributors, as depicted in FIG. 5A. One or multiple affiliate content distributors may receive distributed live streaming content from a content distribution center 222.

Subsequently, the first content origination source 108 may provide the first live broadcasting stream 102, as a local broadcast 224, in the linear content distribution method using the down-converted live content resolution and frame rate. The first content origination source 108 may also provide the first live broadcasting stream 102 to the rules engine 112, for content distribution. For example, as described with respect to FIG. 2, the rules engine 112 may utilize the encoding and packaging block 154 for content distribution. The operations of the rules engine 112 may be further discussed below.

Alternatively or simultaneously to the linear content distribution method described above, the content source 221 may also provide live streaming content for transmission to the second content origination source 110 (e.g., the NOC 146). As mentioned above, the content source 221 may provide the live content to the NOC 146 in the resolution and/or frame rate in which the live content is originally produced, such as 2160p, 1080p and/or HDR format. The above described techniques may enable a format agnostic content flow.

Accordingly, in certain embodiments, the NOC 146 may receive and/or utilize content in a variety of streaming formats from various additional content sources 226. As illustrated, the content received by the NOC 146 may be up-converted by an up-converter 228 component. In certain embodiments, the NOC 146 may transmit content out of the second content origination source 110 using a higher resolution (e.g., UHD), varied brightness and/or contrast range (e.g., HDR), and/or frame rate (e.g., 60 Hz) in comparison to the first content origination source 108.

In some embodiments, the second content origination source 110 may also receive additional live streaming content from the content distribution center 222. The live content provided by the content distribution center 222 may be broadcasted or spliced into the live streaming content provided by the content source 221. An example of the live streaming content provided by the content distribution center 222 may be advertisement content, subtitles, or other forms of edited live streaming content stream. Moreover, the content distribution center 222 may provide the additional live content to the NOC 146 in various formats, such as 1080i resolution. The NOC 146 may use an up-converter 230 in certain embodiments. For example, the up-converter 230 may up-convert content (e.g., 1080i SDR content) to a higher quality version (e.g., 4k HDR) to adhere with a desired streaming format of the NOC 146 (e.g., desired resolution, color/brightness range, and/or frame rate).

The NOC 146 may use a compensation unit 232 for coordination between the various live streaming contents provided to the NOC 146. The compensation unit 232 may include various circuitry to manipulate the received streaming contents for a coherent and coordinated transmission of the live streaming content from the content source 221 and the additional content sources 226. For example, the compensation unit may utilize a first delay compensation unit 234 for a first live content received from the up-converter 228 and a second delay compensation unit 236 for a second live content received from the up-converter 230 for coordination between the first and second live content.

Furthermore, the compensation unit 232 may include the UHD channel 150 which may be utilized in synchronization with the delay compensation units 234 and 236. As mentioned above, the UHD channel 150 may provide or cause provision of the second live broadcasting stream 104 to the local encoder 152 and/or sometimes a video encoder 238. The video encoder 238 may include, by the way of example, a Dolby Atmos video encoder and may provide the encoded 4K live content to MVPD(s) 239. The local encoder 152 may provide the encoded second live broadcasting stream 104 to the rules engine 112, where the UHD live content is received by the encoding and packaging block 154.

As noted above and depicted in FIG. 5B, the rules engine 112 may receive the first live broadcasting stream 102 and the second live broadcasting stream 104 by the encoding and packaging block 154 the packaging unit 158B, respectively, to cause provision of the hybrid stream 114. As mentioned above, the encoding and packaging block 154 may include the encoding unit 156 and the packaging unit 158A. The rules engine 112 may utilize the encoding and packaging block 154 and the packaging unit 158B in coordination with the cache or other storage 160A and/or 160B and the manifest switcher 162 to provide the respective manifest files of the received live broadcasting streams.

In some embodiments, the encoding and packaging block 154 may transmit the ABR encoded content to a segment cache 246. The cache or other storage 160 may retain a certain portion (e.g., certain duration) of the live content received from the encoding and packaging block 154 to allow for time shifted segment retrieval, as discussed above. The cache or other storage 160 may be utilized concurrently with the provision of a merged manifest file 244 from the manifest switcher 162 to the content viewing devices 106, which is described in detail herein.

The manifest switcher 162, which may be a processor that executes software to generate and use the merged manifest file 244, may receive a station manifest file 240 from the encoding and packaging block 154 associated with the first content origination source 108. The manifest switcher 162 may also receive a NOC manifest file 242 from the encoding and packaging block 154 associated with the second content origination source 110. The use of two manifest files is for illustration purposes, in other embodiments various numbers of manifest files may be received from various content origination sources by the streaming system 220.

Moreover, in some other embodiments, the station manifest file 240 and/or the NOC manifest file 242 may be received directly from the first content origination source 108 and/or the second content origination source 110. Furthermore, in specific embodiments, the station manifest file 240 and/or the NOC manifest file 242 may be received in the form of a merged manifest file associated with a hybrid stream received directly from the first content origination source 108 and/or the second content origination source 110. For example, in such embodiments, the first live broadcasting stream 102 and/or the second live broadcasting stream 104 may include a respective rules engine (e.g., similar to the rules engine 112) receiving multiple live broadcasting streams and providing the hybrid stream to the manifest switcher 162.

The manifest switcher 162 may use the received manifest files to generate the merged manifest file 244. The manifest switcher 162 may use the switchover markers embedded within the station manifest file 240 and the NOC manifest file 242 as an indication for switching between the first live broadcasting stream 102 and the second live broadcasting stream 104 associated with the two manifest files. The manifest switcher 162 may create the merged manifest file 244 that includes the switchover markers to cause provision of one streaming content at each time from the multiple content streams. The merged manifest file 244 may include the switchover indications based upon the switchover indications of the station manifest file 240 and the NOC manifest file 242.

As mentioned above, the time difference between the switchover markers in different manifest files (e.g., the "offset value") may be calculated. The offset value may be applied onto the merged manifest file 244 to align the merged segments from the station manifest file 240 and the NOC manifest file 242. Moreover, the manifest switcher 162 may provide the merged manifest file 244 to the one or multiple content viewing devices 106. The merged manifest file 244 may cause provision of the first live broadcasting stream 102 or the second live broadcasting stream 104 to the content viewing devices 106 via a common channel (e.g., the hybrid stream 114). Moreover, encoding parameters may be different between two content streams and an encoding content stream may also be provided to an OTT device or adaptive IRD device of a content viewing device 106.

In some embodiments, an indication of content stream format change, such as a discontinuity tag, may also be provided to the content viewing device 106 in which the discontinuity tag would include, or be followed by, decoding parameters. For example, to indicate that new decoding parameters for the first or the second content stream should be used. Aside from decoding parameters, the discontinuity tag or similar parameters may include or be followed by video format information and/or bitrate change information for switching to the different content stream.

Such information may be received by the rules engine 112 and embedded as a unique identifier (e.g., using a SCTE-35 and/or SCTE-104 indicator) in the respective manifest files. For example, the rules engine 112 may use the unique identifiers to identify different pieces of a streaming content and to determine the corresponding decoding parameters for a particular piece of content. In specific embodiments, the decoding parameters may indicate the video format, bit rate, and the one or more scheduling rules, among other information, to the rules engine 112. Moreover, the rules engine 112 may provide the switchover markers, based on the decoding parameters and/or the unique identifiers, to trigger switching to a specific streaming content with a specific streaming quality (e.g., video format and bit rate, among other parameters). Such streaming content may include the first live broadcasting stream 102, the second live broadcasting stream 104, a hybrid stream, advertisements, provided with different streaming quality. Accordingly, the rules engine 112 may facilitate content switching based on receiving the decoding parameters and/or the unique identifier and by providing the switchover markers as triggers.

Accordingly, the encoding and packaging block 154 may transmit the first live broadcasting stream 102 and the second live broadcasting stream 104 to the content segment cache 246 in conjunction with the transmission of the merged manifest file 244 by the manifest switcher 162 to the content viewing device 106. As mentioned above, the content viewing devices 106 may include an OTT device and/or an IRD device to receive the merged manifest file 244 in different embodiments. The OTT device may be used by the content viewing device 106A to cause provision of the live content to a user and the IRD device may be used by the content viewing device 106B to cause provision of the live content to other components, such as MVPDs. As mentioned above, the segment cache 246 may retain a certain portion (e.g., duration) of the received live content so the merged manifest file 244 may cause delayed provision of the live content or the retained live content from the segment cache 246 to the content viewing devices 106 in order to maintain synchronized alignment.

Figure 6A:
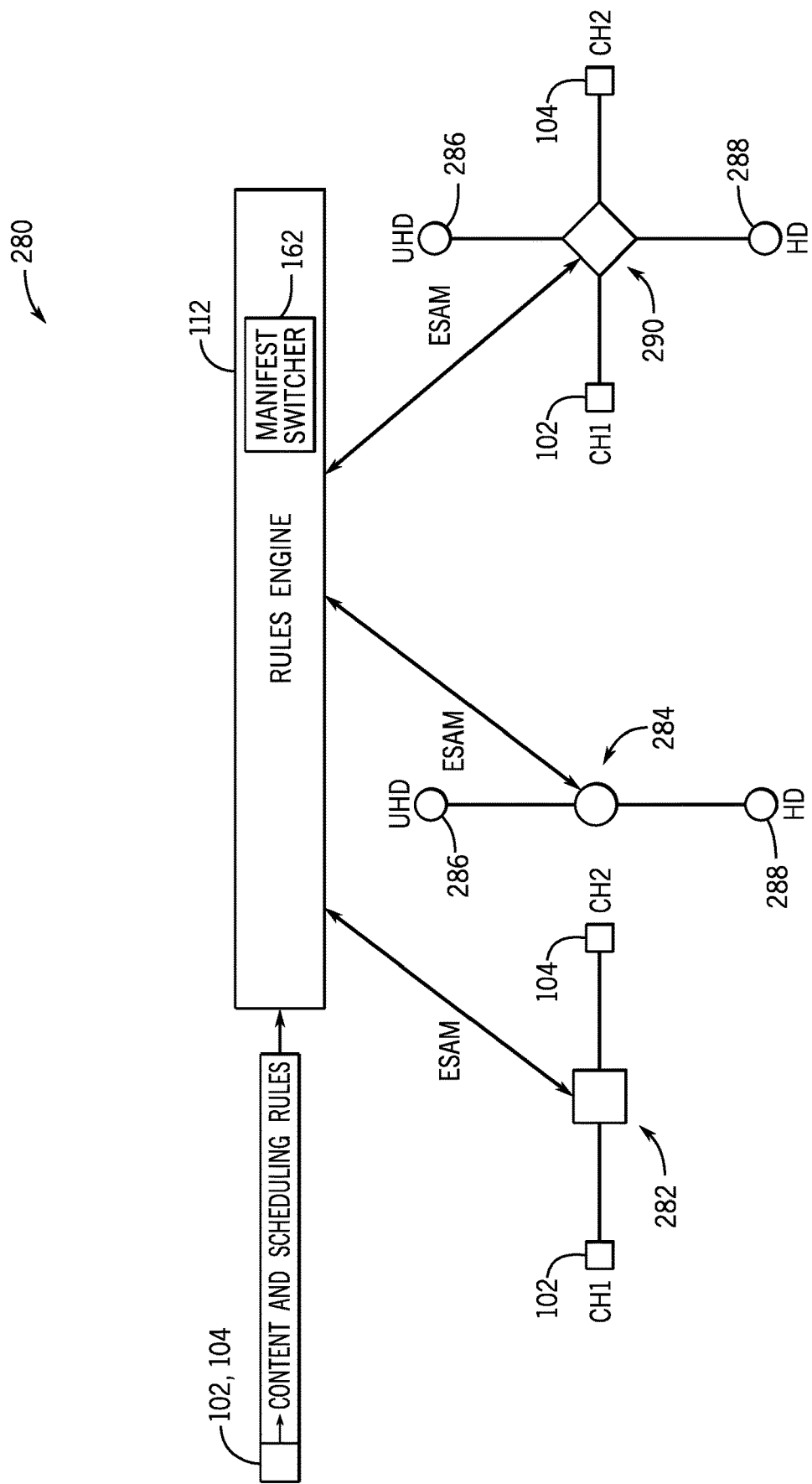
FIG. 6A is a schematic diagram, illustrating different switchover markers that may be provided by the rules engine to cause provision of the different live broadcasting streams, in accordance with aspects of the present embodiments.

Referring now to FIG. 6A, example operations 280 of the rules engine 112 and the manifest switcher 162 are depicted. As mentioned above, the rules engine 112 may take the form of a cloud computing platform or a hardware circuitry positioned as part of an affiliate content distributor facility. In the depicted embodiment of FIG. 6A, the rules engine 112 may receive the first live broadcasting stream 102 and the second live broadcasting stream 104. As discussed above, in some embodiments, the rules engine 112 may encode and package the live broadcasting streams or cause the same to occur. In different embodiments, the rules engine 112 may also receive the respective switchover markers and the scheduling rules included with the raw streaming contents or included in the respective manifest files of the first live broadcasting stream 102 and the second live broadcasting stream 104.

Accordingly, the rules engine 112 may combine some or all of the switchover markers of the received live broadcasting streams to generate and provide a merged manifest file (e.g., the merged manifest file 244). The merged manifest file may include different switchover markers associated with the first live broadcasting stream 102 and the second live broadcasting stream 104 that may cause performance of different switchover functions. In some embodiments, the rules engine 112 may provide the switchover markers to switch between different streaming formats of each live broadcasting stream, switch between different live broadcasting streams (e.g., channels), or both. In specific embodiments, the rules engine 112 may provide the switchover markers using SCTE indicators (e.g., SCTE-35 and/or SCTE-104 indicator) using Event Signaling and Management (ESAM) XML code. However, in other embodiments, the rules engine 112 may provide the switchover markers using different processing techniques.

According to a first example, the rules engine 112 may provide a switchover marker 282 to switch from a first live broadcasting stream to a different live broadcasting stream. For example, the rules engine 112 may provide the switchover marker 282 to cause switching between the first live broadcasting stream 102 and the second live broadcasting stream 104. In one example, the rules engine 112 may provide the switchover marker 282 in response to receiving a switchover marker with the first live broadcasting stream 102 to switch away from the first live broadcasting stream 102 or switch to cause provision of the first live broadcasting stream 102. In another example, the rules engine 112 may provide the switchover marker 282 in response to receiving a switchover marker with the second live broadcasting stream 104 to switch away from the second live broadcasting stream 104 or switch to cause provision of the second live broadcasting stream 104.

In a second example, the rules engine 112 may provide a switchover marker 284 to switch between different streaming formats of a respective live broadcasting stream. For example, in the depicted embodiment, the rules engine 112 may provide the switchover marker 284 to cause switching between UHD streaming format 286 and HD streaming format 288 of a live broadcasting stream (e.g., the first live broadcasting stream 102 or the second live broadcasting stream 104).

Furthermore, in a third example, the rules engine 112 may provide a switchover marker 290 (a combination switchover marker or a multi-purpose switchover marker) to switch simultaneously between different live broadcasting streams as well as different streaming formats of a respective live broadcasting stream. For example, the switchover marker 290 may cause switching between the first live broadcasting stream 102 and the second live broadcasting stream 104 as well as between UHD streaming format 286 and HD streaming format 288. The switchover marker 290 may include an identifier or information that indicates that the switchover marker 290 is a combination switchover marker type or a multi-purpose switchover marker type and contains data for switching both the live broadcasting stream and the streaming format. That said, in different embodiments, the switchover markers 282, 284, and 290 may each switch between different live broadcasting streams and/or different streaming formats.

As such, the rules engine 112 may provide the merged manifest file including the switchover markers 282, 284, and/or 290 to facilitate provision of the hybrid stream 114 to one or more content viewing devices (e.g., content viewing devices 106). Moreover, in some other embodiments, the rules engine 112 may provide the switchover markers 282, 284, and/or 290, using other techniques, such as ESAM XML code. Furthermore, in different embodiments, the rules engine 112 may generate the switchover markers 282, 284, and 290, based on receiving manually inserted switchover indicators and/or automatically generated switchover indicators included with the respective manifest files.

That said, the switchover markers 282, 284, and 290 that are manually inserted by a user may be provided at different stages of a streaming content production and delivery. For example, the manually inserted switchover markers 282, 284, and 290, may be inserted during the streaming content production, the encoding stage, the packaging stage, or a different streaming content production and delivery stage. Different example embodiments of streaming systems using the switchover markers 282, 284, and 290 may be discussed below.

Figure 6B:
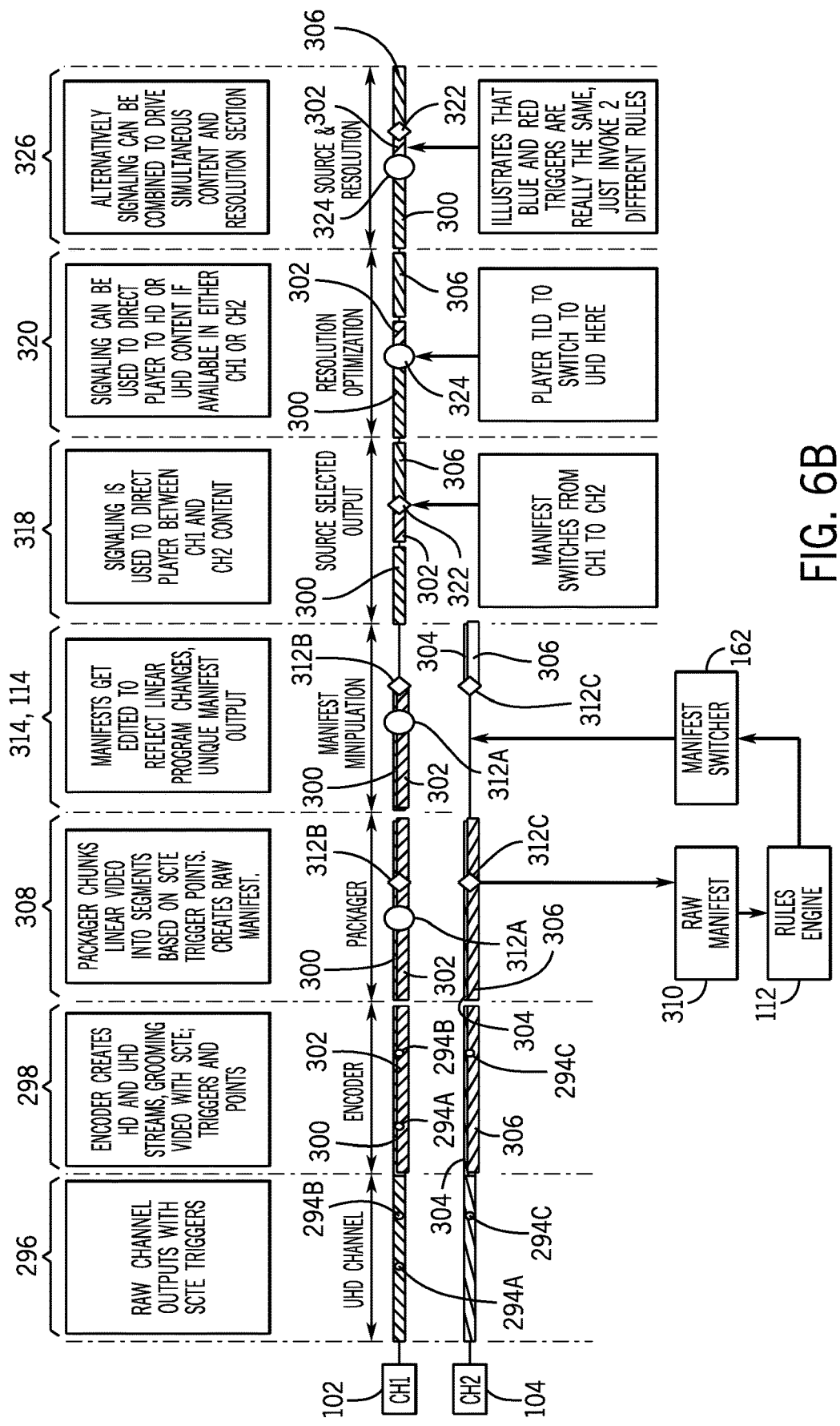
FIG. 6B depicts operation steps of a streaming system using the rules engine, by the way of encoding, packaging, and providing the live broadcasting streams with the switchover markers of FIG. 6A, in accordance with aspects of the present embodiments.

FIG. 6B illustrates example operations of the rules engine 112 for providing the hybrid stream 114. A streaming system 292 may perform the operations described below with respect to FIG. 6B. The streaming system 292 may receive different live broadcasting streams along with the switchover markers and/or the respective scheduling rules, included with the raw streaming content or included with the respective manifest files of different channels. In some embodiments, the streaming system 292 may use a rules engine, such as the rules engine 112 to facilitate provision of the hybrid stream 114.

In the depicted embodiment, the streaming system 292 may receive the first live broadcasting stream 102 and the second live broadcasting stream 104 with the respective switchover markers (e.g., SCTE markers). In some embodiments, each of the first and second live broadcasting streams 102, 104 may be in a raw channel output format with SCTE markers or indicators inserted (e.g., SCTE-104 markers), such as the SCTE indicators 294A, 294B, and 294C at section 296. The SCTE indicators 294A, 294B, and 294C may indicate available switchover times for the received live streaming content. The original content distributors, such as a NOC (e.g., the NOC 146) or an affiliate content distributor (e.g., the affiliate content distributor 142) may provide the SCTE indicators 294A, 294B, and 294C. As mentioned above, the SCTE indicators 294A, 294B, and 294C may be provided manually by a user or may be generated automatically at the NOC or the affiliate content distributor. Moreover, in different embodiments, different switchover markers may be used to indicate available switchover times for the received live streaming content.

At section 298, an encoder associated with each channel of the streaming system 292 may receive the raw channel outputs and create different streaming formats of the first live broadcasting stream 102 and the second live broadcasting stream 104. For example, the local encoder 144 and/or the encoding unit 156 described above may provide the different streaming formats of the first live broadcasting stream 102, including a first streaming format 300 and a second streaming format 302. Moreover, the local encoder 152 and/or the video encoder 238 may provide different streaming formats of the second live broadcasting stream 104, including a first streaming format 304 and a second streaming format 306.

In one embodiment, the first streaming formats 300 and/or 304 may include HD streaming format and/or SDR resolution and the second streaming formats 302 and/or 306 may include UHD streaming format and/or UHD resolution. Moreover, in different embodiments, different pixel count and/or resolutions may be used in different embodiments. For example, a live content origination source may produce and/or provide live streaming content using a high streaming quality (e.g., the second streaming format 302 and/or 306) as well as a low streaming quality (e.g., the first streaming format 300 and/or 304).

At the section 298, the streaming system 292 may include the SCTE indicators (e.g., SCTE-104 indicators) 294A, 294B, and 294C with the first streaming format 300, the second streaming format 302 of the first live broadcasting stream 102, and with the first streaming format 304 and the second streaming format 306 of the second live broadcasting stream 104. Subsequently, at section 308, the streaming system 292 may use one or more packaging units, such as the packaging units 158A and 158B discussed above, to generate raw manifest files 310 including the respective switchover markers associated with each of the live content streams. The packaging units may provide (or generate) the raw manifest files 310 including SCTE indicators (e.g., SCTE-35 indicators) 312A, 312B, and 312C (as the switchover markers) for switching between different live broadcasting streams with different streaming formats.

The packaging units may provide the SCTE indicators 312A, 312B, and 312C (e.g., SCTE-35 indicators) based at least in part on the received SCTE indicators 294A, 294B, and 294C. Moreover, it should be appreciated that a different number of the SCTE indicators 294 and/or SCTE indicators 312 may be used in different embodiments. In some embodiments, the SCTE indicators 312 may indicate at a start and an end of different streaming content segments of the streaming first live broadcasting stream 102 and/or the second live broadcasting stream 104. Furthermore, the SCTE indicators 312 may cause alignment of the different segments of the respective live broadcasting streams.

In one example, the SCTE indicator 312A may correspond to the switchover marker 284 described above with respect to FIG. 6A for switching between different streaming qualities of a streaming content (e.g., HD streaming format 300 and HDR streaming format 302). Moreover, the SCTE markers 312B and 312C may correspond to the switchover marker 290 described above with respect to FIG. 6A for switching between different channels (e.g., the first live broadcasting stream 102 and the second live broadcasting stream 104) and also different streaming qualities.

That said, the packaging units may also generate and/or consider an offset value, such as the offset value described with respect to FIG. 4, when generating the respective manifest files. For example, the packaging units may provide one or more of the SCTE indicators 312 to cause a delay in provision of the first streaming format 300 and the second streaming format 302 of the first live broadcasting stream 102, or the first streaming format 304 and the second streaming format 306 of the second live broadcasting stream 104.

At section 314, the rules engine 112 may provide the hybrid stream 114 by generating and providing a merged manifest file based on receiving the raw manifest files 310 associated with each of the live streaming content. For example, the rules engine 112 may receive the raw manifest files 310 associated with the first live broadcasting stream 102 and the second live broadcasting stream 104 to generate the merged manifest file using the manifest switcher 162. In different embodiments, the rules engine 112 may manipulate one or more of the raw manifest files 310 to generate the merged manifest file or may generate a separate and new merged manifest file based on receiving the raw manifest files 310. The merged manifest file may include SCTE indicator 312A that simultaneously enables switching between different channels/content and different resolutions, and SCTE indicators 312B and 312C that enable switching between channels/content. Accordingly, the streaming system 292 may provide the hybrid stream 114 at the section 314 based on providing the merged manifest file.

As described with respect to the embodiment of FIG. 6A, the merged manifest file may include switchover markers to facilitate switching between the first streaming format 300 and the second streaming format 302 of the first live broadcasting stream 102 and the first streaming format 304 and the second streaming format 306 of the second live broadcasting stream 104. That is, the merged manifest file may cause provision of alternative streaming content segments at the respective switchover times indicated by the switchover markers. For example, the merged manifest file may cause switching to advertisement breaks in a provided segment indicated by the switching markers.

The merged manifest file may also facilitate switching between the first streaming format 300 of the first live broadcast stream 102 and the second streaming format 306 of the second live broadcast stream 104 where the first streaming format 300 is different from the second streaming format 306 (and vice versa). One example embodiment of the hybrid stream 114 is described with respect to the section 314 in an expanded view in sections 318, 320, and 326. The sections 318 and 320 may each depict one respective switchover marker of the merged manifest file whereas the section 326 may depict the resulting linear signal including all the respective switchover markers. For example, the section 326 may depict a resulting linear content distribution interpretation by the content viewing devices 106 (e.g., playback device, player) described above.

At the section 318, a SCTE indicator 322 is depicted. The SCTE indicator 322 may cause the receiver device (e.g., content viewing devices 106) to switch between different live broadcasting streams (e.g., channels) and/or different streaming formats. In specific embodiments, the SCTE indicator 322 may be similar to the switchover marker 290 described with respect to FIG. 6A. The SCTE indicator 322 may cause simultaneous switching from the first live broadcasting stream 102 using a respective streaming format to the second live broadcasting stream 104 using a different streaming format. In particular, in the depicted embodiment, the SCTE indicator 322 may cause switching from the second streaming format 302 (e.g., UHD streaming format) of the first live broadcasting stream 102 to the second streaming format 306 (e.g., UHD streaming format) of the second live broadcasting stream 104.

Referring to section 320, a SCTE indicator 324 of the multiple SCTE indicators 312 is depicted. The SCTE indicator 324 may cause a receiver device to switch between different streaming formats of the one live broadcasting stream (e.g., channel). In specific embodiments, the SCTE indicator 324 may be similar to the switchover marker 284 described with respect to FIG. 6A. As depicted in section 320 of the depicted embodiment, the SCTE indicator 324 may cause switching between the first streaming format 300 (e.g., HD) and the second streaming format 302 (e.g., UHD) of the first live broadcast stream 102.

Referring to section 326, the SCTE indicators 324 and 322 are depicted. The SCTE indicator 324 may cause the receiver device to switch between different streaming formats (e.g., HD to UHD) of the first live broadcast stream 102. The SCTE indicator 322 may cause the receiver device to switch simultaneously from the second streaming format 302 of the first live broadcast stream 102 to the first streaming format 304 of the second live broadcast stream 104. As such, the SCTE indicator 322 is being used to drive simultaneous content and resolution selection. Although the foregoing examples describe the switching operations within the context of SCTE markers, other triggers may be used to indicate a switchover time for switching to a different broadcasting stream and/or a different streaming format.

Nevertheless, as described above, the operations of the rules engine 112 may be based on receiving the switchover markers associated with each of the received live broadcasting streams to provide a merged manifest file. In different embodiments, such switchover markers may be provided by a NOC, as the central content distributor, and/or the affiliate content distributors for local distribution of the received streaming content. As such, although the rules engine 112 is described as a single unit, the rules engine 112 may include distributed portions on the respective NOC and on one or more of the affiliate content distributors.

For example, the rules engine 112 may be distributed between a NOC (e.g., the second content origination source 110 of FIG. 1) and the affiliate content distributor 142 may be positioned between the affiliate content distributors and the content viewing devices (e.g., on edge of the affiliate content distributors) to receive the scheduling rules and/or the manifest files from both the central NOC and the affiliate content distributors.

As described above, the manifest files (e.g., the raw manifest files 310) may include switchover markers indicative of switchover times between different live broadcasting streams and/or different streaming formats (e.g., qualities) associated with each of the live broadcasting streams. Moreover, the rules engine 112 may also use scheduling rules to provide the merged manifest file. Furthermore, the scheduling rules may include priority information for causing provision of the streaming content, as will be appreciated.

Figure 7:
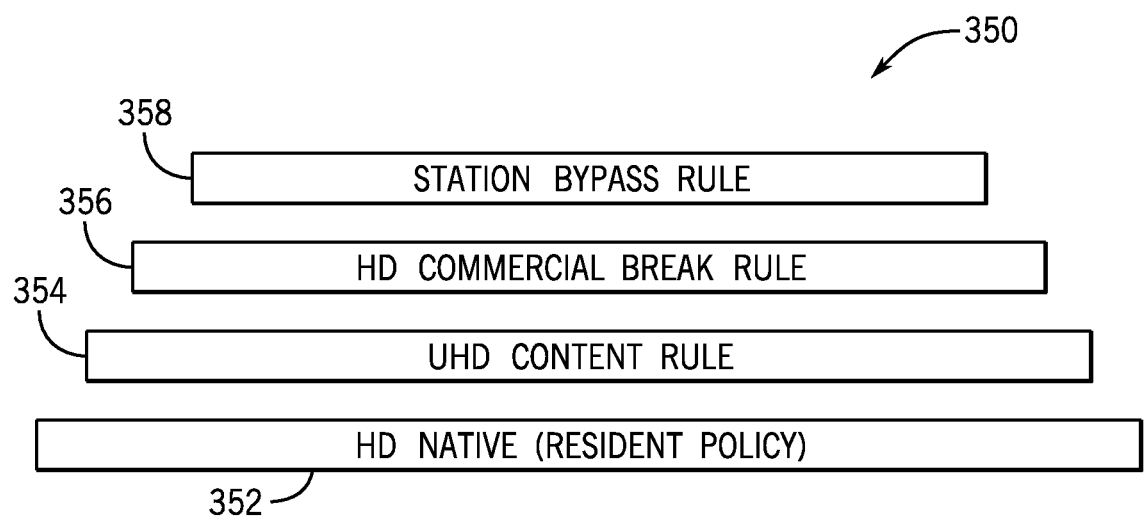
FIG. 7 depicts a hierarchy of scheduling rules associated with providing the switchover markers for causing provision of different live broadcasting streams using the switchover markers, in accordance with aspects of the present embodiments.

FIG. 7 depicts an example hierarchy of scheduling rules 350 in accordance with certain embodiments. The scheduling rules 350 may indicate underlying logic driving provision of the switchover markers in the merged manifest file (e.g., merged manifest file 244). An affiliate content distributor (e.g., affiliate content distributor 142) may provide the switchover markers based on the scheduling rules 350 associated with availability of the first live broadcasting stream 102, the second live broadcasting stream 104, or both, as will be appreciated. For example, the affiliate content distributor may generate the merged manifest file including the switchover markers. The scheduling rules 350 may include a series of rules, which are organized in a stack overlay based on priority. The rules may indicate a resolution, bitrate, and/or other information for prioritizing switching between streaming content.

By the way of example, a national network may provide the first live broadcasting stream 102 to the affiliate station. The national network may provide the switchover markers with the streaming content or may provide a manifest file including the switchover markers for switching between a UHD national network feed and an HD national network feed to the affiliate content distributor. Accordingly, the affiliate content distributor may provide the received switchover markers or manifest file to downstream receivers.

In an additional or alternative embodiment, the affiliate content distributor may generate the merged manifest file to enable switching between the national network feed (e.g., the first live broadcasting stream 102) and local feed from the affiliate content distributor (e.g., the second live broadcasting stream 104, advertisement, local news, etc.). In such embodiments, the affiliate content distributor may include a "local rules engine," similar to the rules engine 112, that may facilitate switching between different streaming content. In some cases, the national network may provide the national network feed to the affiliate content distributor along with a first manifest file and the affiliate content distributor may use the local rules engine (using the scheduling rules 350) to generate a second manifest file (e.g., the merged manifest file). That is, the affiliate content distributor may generate the merged manifest file including switchover markers received from upstream content sources as well as switchover markers generated locally using local rules, as will be appreciated.

With the foregoing in mind and by the way of example, the default rule may be an HD Native policy 352 that may cause provision of the streaming content from the affiliate content distributor when another rule is not applied. The HD native policy 352 may be the foundation from which all other rules are applied and may be referred to as a Resident Policy since it may be the foundation from which all other rules are applied.

When a UHD event is available, the rules engine 112 may provide a switchover marker to cause provision of the UHD streaming content. A UHD content rule 354 may cause prioritized provision of the UHD streaming content, when the UHD streaming is available. For example, the UHD content rule 354 may cause switching from the first streaming formats 300 or 304 to the second streaming formats 302 or 306, respectively, when the second streaming formats 302 or 306 are available. As depicted in FIG. 7, the UHD content rule 354 may stack on top of the HD native policy 352. That is, the UHD content rule 354 may take priority over the HD native policy 352. That said, when a UHD streaming content terminates (e.g., a program end indicator is received), the rules engine may switch back to the HD native policy 352 to cause provision of HD streaming content.

A HD commercial break rule 356 may cause prioritized provision of HD commercial breaks during commercial breaks. The rules engine 112 may use the HD commercial break rule 356 to allow provision of local commercial insertions when available. For example, the HD commercial break rule 356 may ensure the commercials make it through to the content viewing devices, such as the content viewing devices 106 described above. The HD commercial break rule 356 may enable, for example, a local affiliate content distributor or a NOC to provide respective content. The HD commercial break rule 356 may take priority over the UHD content rule 354 and the HD native policy 352.

Lastly, a station bypass rule 358 may take the highest priority over the HD commercial break rule 356, the UHD content rule 354, and the HD native policy 352. When triggered, the station bypass rule 358 may allow one or more downstream content distributors to provide respective streaming contents with priority. In some embodiments, the station bypass rule 358 may be triggered locally by one or more affiliate content distributors. For example, the station bypass rule 358 may be scheduled locally and will be triggered exclusively by SCTE-104 messages inserted by the one or more affiliate content distributors. Moreover, the station bypass rule 358 may be handled locally by edge computing resources positioned at an edge of affiliate content distributors. In specific embodiments, the station bypass rule 358 may allow transitioning between first live broadcasting stream 102 and second live broadcasting stream by the affiliate content distributor 142 positioned at the first content origination source 108.

The scheduling rules described above and the respective priorities are provided as one prioritization example and other scheduling rules and priorities may be used in different embodiments. For example, different streaming formats may be used in different prioritization embodiments. Moreover, the rules engine 112 may implement the described scheduling rules by providing different switchover markers, such as the switchover markers 282, 284, and 290 described above with respect to FIG. 6A or other switchover markers. Accordingly, the rules engine 112 may cause provision of different live broadcasting streams using different streaming formats (e.g., streaming quality) using respective scheduling rules and switchover markers.

FIGS. 8A-8F depict different embodiments of a streaming system 372 including the rules engine 112 and incorporating the scheduling rules 350 discussed above. Accordingly, the embodiments of FIGS. 8A-8F may be described with respect to relevant scheduling rules 350. In some embodiments, the streaming system 372 may be similar to the streaming systems 100, 140, and/or 220 described above for providing a hybrid stream (e.g., the hybrid stream 114) including portions of the first live broadcasting stream 102 and the second live broadcasting stream 104. However, it should be appreciated that in different embodiments, the streaming system 372 may include similar or different components compared to the streaming systems 100, 140, and/or 220 described above.

In specific embodiments, the streaming system 372 may be disposed at an edge position of an affiliate content distributor. Moreover, the streaming system 372 may take the form of a local computing system including processing circuitry disposed at the affiliate content distributor, may take the form of a cloud-based service implemented at a remote location with respect to the NOC and the affiliate content distributor, or any other suitable form.

The streaming system 372 may include a live streaming content sources 382. The live streaming content sources 382 may receive and propagate streaming content of different content origination sources (e.g., a NOC, an affiliate content distributor, or any combination thereof). For example, the rules engine 112 may provide the switchover markers associated with each of the first live broadcasting stream 102 and the second live broadcasting stream 104 that include an upstream hybrid stream, individually, before the live streaming content sources 382. Moreover, the rules engine 112 may provide the switchover markers for switching between the first live broadcasting stream 102 and the second live broadcasting stream 104 after the live streaming content sources 382.

In the depicted embodiments of FIGS. 8A-8F, the first live broadcasting stream 102 may include an upstream hybrid stream including a first channel 378 and a second channel 380. Accordingly, the rules engine 112 may provide the internal switchover marker 370 for switching between the first channel 378 and the second channel 380 of the first live broadcasting stream 102 before the live streaming content sources 382. The first live broadcasting stream 102 may also include a first scheduling rule 374 and a second scheduling rule 376 associated with the first channel 378 and the second channel 380, respectively.

The first scheduling rule 374 may be indicative of default provision of the streaming content of the first channel 378 and the second scheduling rule may include an overriding rule to cause provision of the streaming content of the second channel 380. That is, the second scheduling rule 376 may take priority over the first scheduling rule 374. In different embodiments, the first scheduling rule 374 and the second scheduling rule 376 may include different scheduling rules, such as the scheduling rules 350 described above. Nevertheless, the first channel 378 and the second channel 380 may each include a respective streaming content with similar streaming quality. Accordingly, the internal switchover marker 370 may be similar to the switchover marker 282 described with respect to FIG. 6A for switching between different channels.

Moreover, the rules engine 112 may use the internal switchover marker 370 based on receiving the second scheduling rule 376. That said, in different embodiments, the first live broadcasting stream 102 may include one upstream channel, the second live broadcasting stream 104 may include an upstream hybrid stream, among other possibilities. Different embodiments for switching between streaming contents of the first live broadcasting stream 102 and the second live broadcasting stream 104, after the live streaming content sources 382, may be described with respect to FIGS. 8A-8F below.

Figure 8A:
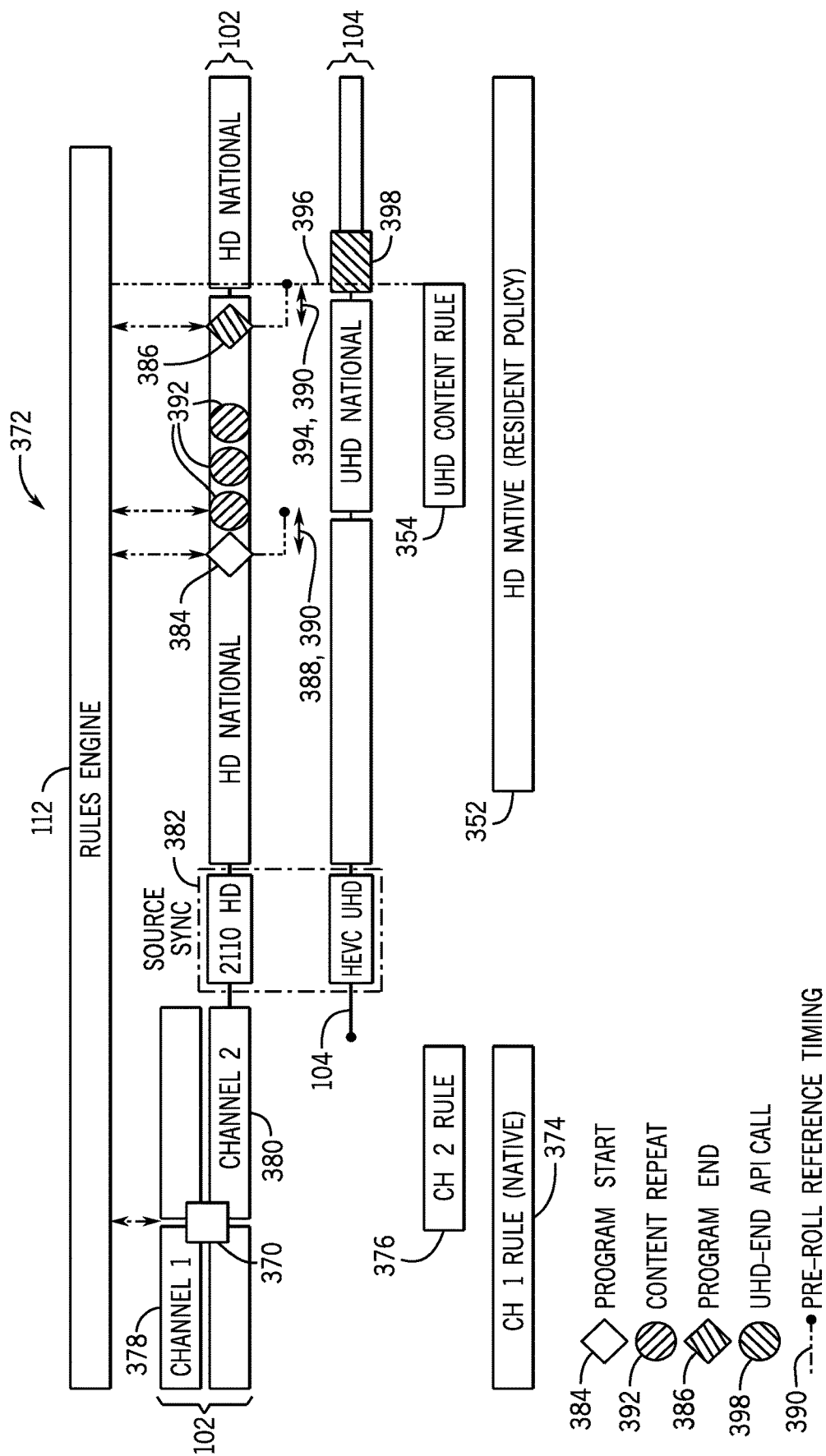
FIG. 8A-8F depict example operations of a streaming system using the hierarchy of scheduling rules, in accordance with aspects of the present embodiments.

By the way of example, FIG. 8A depicts a first example of providing scheduled streaming content using the streaming system 372 including the rules engine 112. In FIG. 8A, provision of the first live broadcasting stream 102 and the second live broadcasting stream 104 using a respective streaming content quality is depicted. By the way of example, the streaming system 372 may cause provision of different segments of the first live broadcasting stream 102 using HD streaming quality format and the second live broadcasting stream 104 using UHD streaming quality format. Accordingly, based on using the scheduling rules 350, the streaming system 372 may cause provision of the first live broadcasting stream 102 using HD streaming quality by default, as will be appreciated. Moreover, it should be appreciated that in different embodiments, different number of live broadcasting streams with different streaming content quality may be used.

The streaming system 372 may cause provision of the second live broadcasting stream 104 based on receiving the first switchover marker 384 indicative of a start of a program segment of the second live broadcasting stream 104. As such, the streaming system 372 may switch to the second live broadcasting stream 104 based on receiving the first switchover marker 384 and the UHD content rule 354. Subsequently, the streaming system 372 may return to the first live broadcasting stream 102 based on receiving a second switchover marker 386. The second switchover marker 386 may be indicative of an end of a program segment of the second live broadcasting stream 104 being provided or a start of another segment of the first live broadcasting stream 102. Based on the HD native policy 352 rule, the streaming system may switch back to the first live broadcasting stream 102 when the HD streaming content becomes available.

In one example, the first live broadcasting stream 102 may include a national feed associated with a specific region and be provided by a respective affiliate content distributor. The second live broadcasting stream 104 may include an international feed that may be provided to multiple affiliate content distributors associated with different regions. Nevertheless, the streaming system 372 may use the rules engine 112 to cause provision of different segments (or portions) of the first live broadcasting stream 102 and the second live broadcasting stream 104 according to the switching times indicated by the switchover markers and by incorporating the scheduling rules 350.

The switchover markers may be provided with the live streaming content. For example, the switchover markers may be received with raw streaming content or respective manifest files of the first live broadcasting stream 102 and the second live broadcasting stream 104, as described above. Moreover, the respective packaging units of the NOC and/or the affiliate content distributors (e.g., the packaging units 158A and 158B described above) may generate respective manifest files of the first and second live broadcasting streams 102 and 104. Subsequently, a respective manifest switcher of the rules engine (e.g., the manifest switcher 162) may generate a respective merged manifest file (e.g., the merged manifest file 244).

The rules engine 112 may provide the merged manifest file to playback devices (e.g., the content viewing devices 106) with the streaming contents to cause provision of portions of the first live broadcasting stream 102 and the second live broadcasting stream 104 at the respective times (e.g., the hybrid stream 114) with a respective streaming quality. It should be appreciated that the playback devices may refer to MVPDs, and OTT devices, or any other viable play back device to cause provision of portions of the first live broadcasting stream 102 and the second live broadcasting stream 104 at the respective times (e.g., the hybrid stream 114) with a respective streaming quality.

The first switchover marker 384 may indicate a switchover frame provided with a pre-roll reference time 390. The pre-roll reference time 390 may include a time period based on a offset/buffer 388 for providing streaming content based on a pre-roll reference time. In some embodiments, the offset/buffer 388 may refer to equal time periods for receiving switchover markers in recursive time periods. In some other embodiments, the offset/buffer 388 may refer to a calculated offset value for providing a respective streaming content. For example, the streaming system 372 may receive the switchover markers in repeated time periods based on the offset/buffer 388 to cause provision of the respective streaming content based on the pre-roll reference time.

Accordingly, the pre-roll reference time 390 in the depicted embodiment may refer to a duration of the offset/buffer 388. In other embodiments, the rules engine 112 may use different offset/buffer values for switching from the first live broadcasting stream 102 to the second live broadcasting stream 104. Nevertheless, in the depicted embodiment, the streaming system 372 may cause provision of the second live broadcasting stream 104 based on receiving the first switchover marker 384 and triggering the UHD content rule 354 based on the pre-roll reference time 390.

In the depicted embodiment, the streaming system 372 may also use content repeat markers 392. The streaming system 372 may use the content repeat markers 392 to cause continued provision of the currently streaming live broadcasting content. For example, the streaming system 372 may cause continued provision of the second live broadcasting stream 104, based on receiving the content repeat markers 392.

As described above, the streaming system 372 may switch back to the first live broadcasting stream 102 based on receiving the second switchover marker 386. The streaming system 372 may cause switching back to the first live broadcasting stream 102 at a referenced time indicated by the second switchover marker 386. Similar to the provision of the first switchover marker 384, the rules engine 112 may provide the second switchover marker 386 based on an offset/buffer 394. Accordingly, the streaming system 372 may switch back to the first live broadcasting stream 102 after a time period associated with the offset/buffer 394.

In the depicted embodiment, the offset/buffer 394 may include a time period equal to the offset/buffer 388. However, it should be appreciated that in different embodiments, different offset/buffer values may be used. Moreover, the first switchover marker 384 and the second switchover marker 386 may be provided based on the switchover marker 290 described with respect to FIG. 6A for switching between different channels and different streaming quality (e.g., HD and UHD quality).

Furthermore, the second live broadcasting stream 104 may terminate at the time 396. Accordingly, the NOC may also provide a termination indication 398 informative of termination of the second live broadcasting stream 104. In some embodiments, the termination indication 398 may include an API command that may inform the downstream streaming systems, such as the streaming system 372, to force switching back to the first live broadcasting stream 102. The indication 398 may prevent the rules engine 112 and/or the streaming system 372 from switching to or remaining in the second live broadcasting stream 104 after termination of the second live broadcasting stream 104. Similar indications may inform termination of the first live broadcasting stream 102.

Figure 8B:
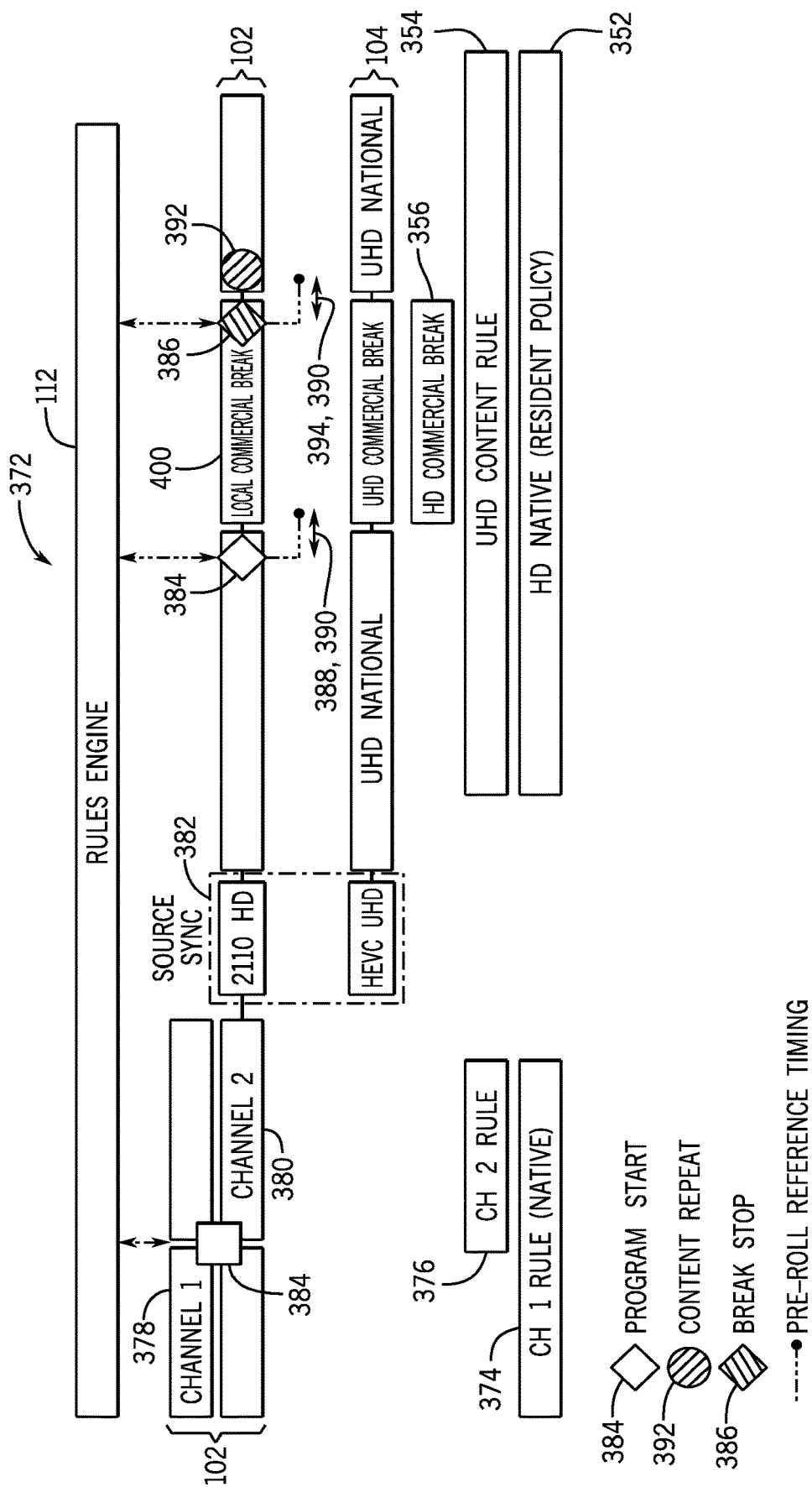

Referring now to FIG. 8B, a second example of operations of the streaming system 372 is depicted. In the depicted embodiment, the first live broadcasting stream 102 may include a commercial break segment 400 (e.g., using HD quality) and the second live broadcasting stream 104 may include UHD streaming content. The streaming system 372 may cause switching between the second live broadcasting stream 104 and the first live broadcasting stream 102 based on receiving the first switchover marker 384 and the second switchover marker 386.

The first switchover marker 384 may indicate a switchover to the commercial break segment 400. In the depicted embodiment, the first switchover marker 384 may indicate a switching time to local commercial break provided by the first live broadcasting stream 102. Accordingly, the rules engine 112 may facilitate switching from the second live broadcasting stream 104 to the first live broadcasting stream 102 based on the HD commercial break rule 356. That is, because the commercial break segment 400 is prioritized for provision over the UHD content, the streaming system 372 may cause provision of the commercial break segment 400 based on receiving the first switchover marker 384.

The second switchover marker 386 will trigger the removal of the HD commercial break rule 356, causing a return to the underlying UHD content rule 354 and a return to the second live broadcasting stream 104 after a time period associated with the offset/buffer 394. In the event the second switchover marker 386 is missed, the switch back to the second live broadcasting stream 104 will occur on the content repeat marker 392. Moreover, the first switchover marker 384 and the second switchover marker 386 may be provided based on the switchover marker 290 described with respect to FIG. 6A for switching between different channels and different streaming quality (e.g., HD and UHD).

Figure 8C:
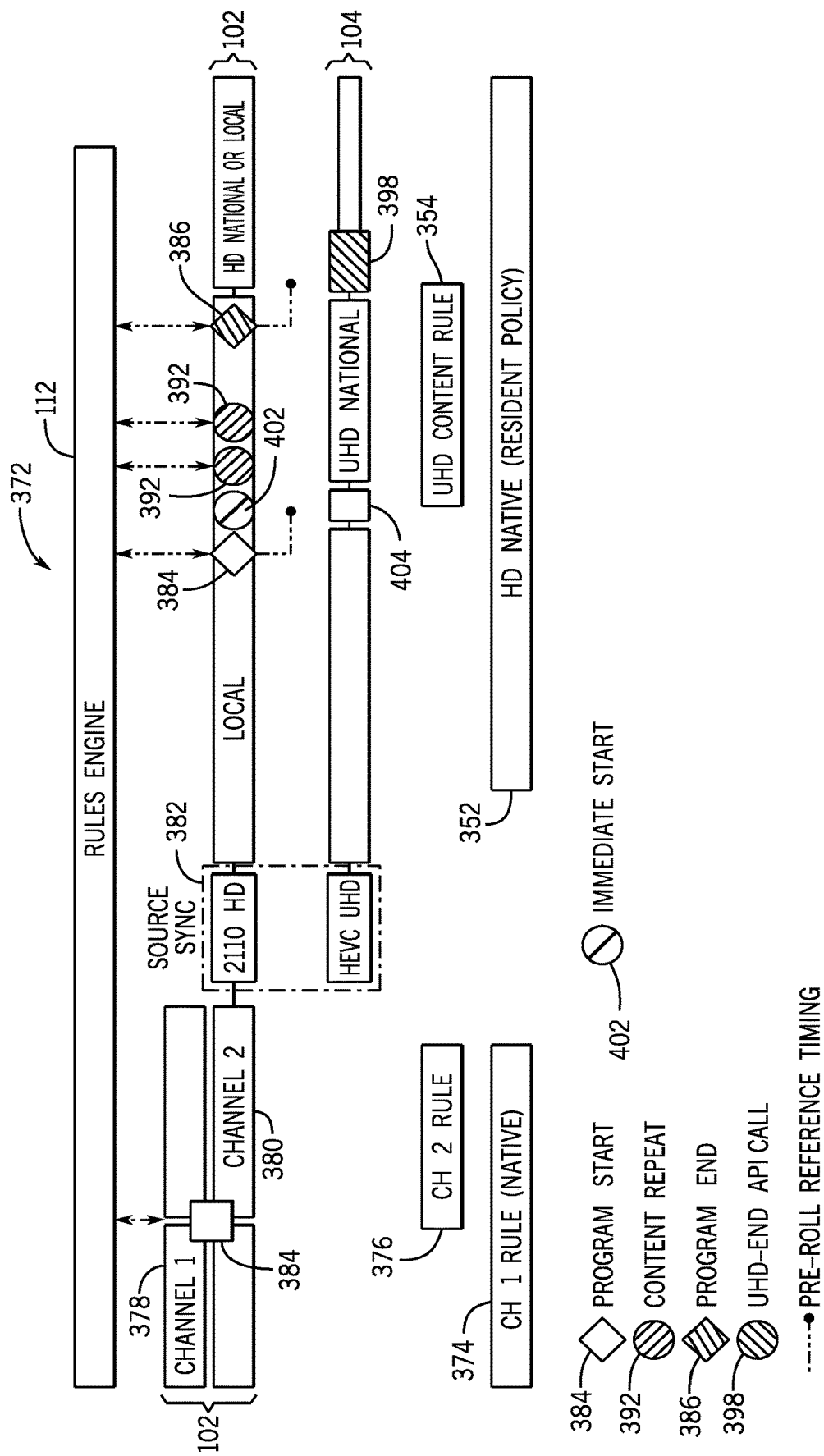

FIG. 8C depicts a third example of operations of the streaming system 372. In the depicted embodiment, the streaming system 372 may, by the way of example, miss the first switchover marker 384 to provide UHD content provided by the second live broadcasting stream 104. For example, the affiliate content distributor, providing the first live broadcasting stream 102, may be providing prioritized content, such as HD commercial content, when the first switchover marker 384 is received. In the depicted embodiment, the streaming system 372 may also miss a subsequent immediate-start trigger 402 (a trigger without a timing offset/buffer) at a later frame if the affiliate is in local programming and joins the national feed even a frame late. In some embodiments, the immediate start trigger 402 may include a content repeat marker 392 that may indicate immediate switching when missing the first switchover marker 384.

In such embodiments, a portion 404 of the UHD streaming content of the second live broadcasting stream 104 may be missed. The streaming system 372 may switch to UHD content of the second live broadcasting stream 104 by using the content repeat markers 392 when the prioritized content ends. As described above, the content repeat markers 392 may indicate continued provision of a previously started streaming content. For example, when the affiliate content distributor provides an indication of an end of a prioritized content, the streaming system 372 may cause switching to the UHD content after the UHD content has started. Although causing provision of the UHD content is delayed, the streaming system 372 may cause provision of the correct streaming content according to the scheduling rules 350.

Similar to the embodiment of FIG. 8A, the streaming system 372 may cause switching back to the HD content provided by the first live broadcasting stream 102 based on receiving the second switchover marker 386. Moreover, the NOC may also provide an "end of UHD" API command by providing the termination indication 398 to indicate an end of the UHD content provided by the second live broadcasting stream 104 to the streaming system 372 and all other streaming systems (e.g., affiliate edge devices to force the switch back to HD and prevent being stuck in the second live broadcasting stream 104).

Figure 8D:
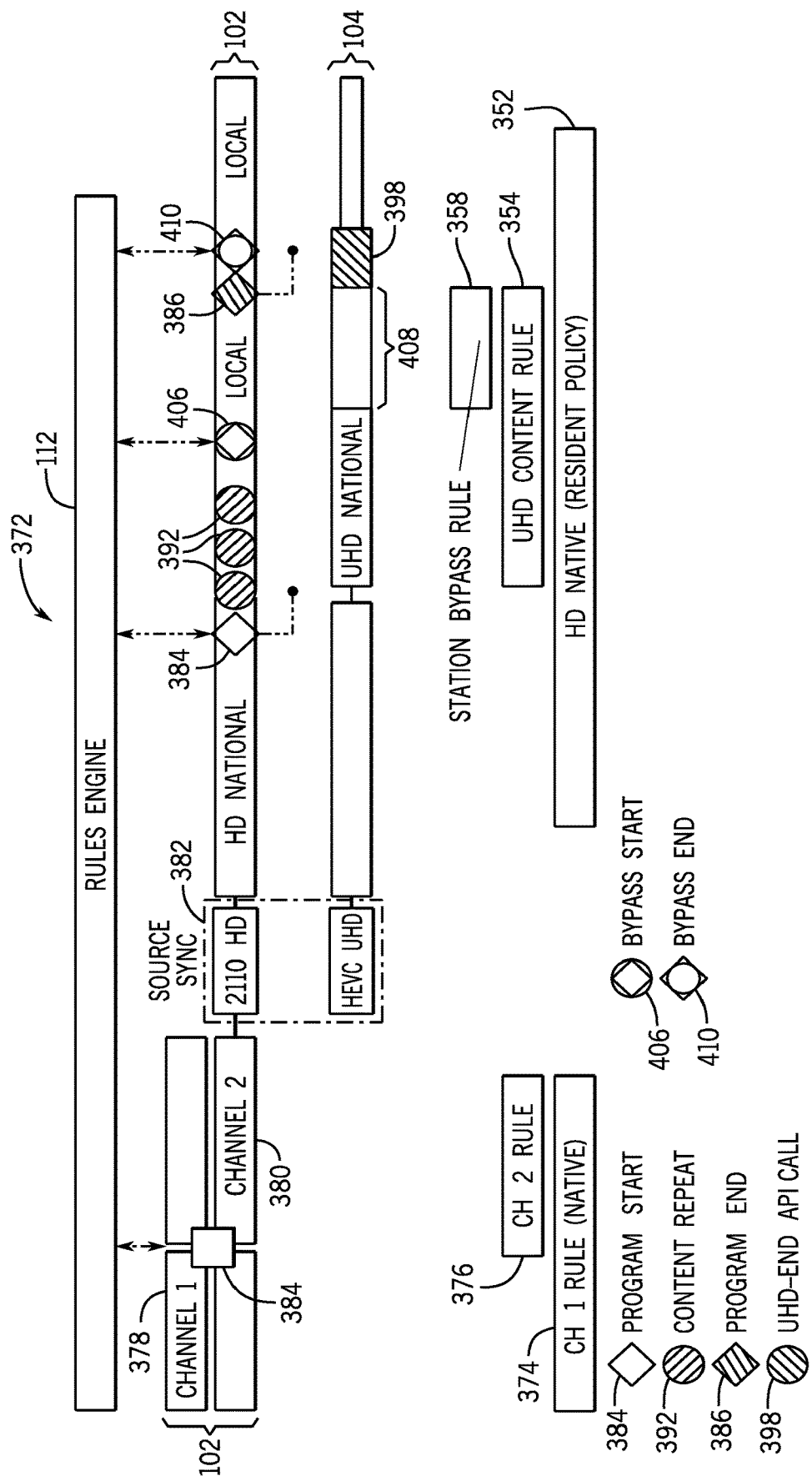

FIG. 8D depicts another embodiment of the streaming system 372 using the scheduling rules 350. The embodiment of FIG. 8D is related to addressing timing conflicts when prioritized streaming content using the station bypass rule 358 is provided. In one example, the scheduling conflict may be caused by prioritized provision of local breaking news using the station bypass rule 358. In another example, the scheduling conflict may be caused by an UHD content, provided by the second live broadcasting stream 104, that is going to end later than an originally scheduled end time of a streaming content with higher priority, based on the scheduling rules 350. In such embodiments, the streaming system 372 may use the station bypass rule 358 to switch to the prioritized streaming content that may be provided by the first live broadcasting stream 102, the second live broadcasting stream 104, or another content streaming source.

Turning to FIG. 8D, the streaming system 372 may switch from a first live broadcasting stream 102, provided in HD quality, to a second live broadcasting stream 104, provided in UHD quality, upon receiving the first switchover marker 384 indicating the start of the second live broadcasting stream 104. Subsequently, the NOC station or affiliate content distributor may signal, using its local master control, that it is breaking in to both the first live broadcasting stream 102 and the second live broadcasting stream 104 by inserting a bypass start switchover marker 406 into the first live broadcasting stream 102. The bypass start switchover marker 406 then causes provision of the prioritized streaming content at time segment 408 based on the station bypass rule.

The prioritized streaming content may be provided by an HD national feed and/or a UHD national feed, associated with the first live broadcasting stream 102 or the second live broadcasting stream 104, from a master controller. In specific embodiments, the bypass switchover marker 406 may be provided using a SCTE indicator. Based on the streaming source of the prioritized streaming content, the bypass start switchover marker 406 may result in an immediate switch to a respective streaming content source to cause provision of the prioritized streaming content. In the depicted embodiment, the prioritized streaming content may be provided in HD quality. Accordingly, the bypass start switchover marker 406 may switch between different channels and different streaming qualities.

Moreover, a bypass end switchover marker 410 may indicate an end of the time segment 408, indicative of an end of provision of the prioritized streaming content. Similar to the bypass start switchover marker 406, the bypass end switchover marker 410 may be provided (e.g., using SCTE indicators) by a master controller. In the depicted embodiment, the streaming system 372 may receive indicators to provide HD streaming content provided by the first live broadcasting stream 102 after receiving the bypass end switchover marker 410. However, as illustrated, because the bypass end switchover marker 410 is received after the second switchover marker 386, the streaming system 372 may use a time-based expiration rule to cause provision of the first live broadcasting stream 102. That is, the streaming system 372 may not implement the bypass end switchover marker 410 to cause provision of the second live broadcasting stream 104 based on receiving the second switchover marker 386 before the bypass end switchover marker 410.

In one embodiment, the streaming system 372 may use such time-based expiration rule to cause provision of the intended streaming content after a threshold amount of time after receiving the bypass end switchover marker 410. For example, the streaming system 372 may use the content repeat markers 392 after the threshold amount of time to cause provision of the streaming content provided by the first live broadcasting stream 102. Moreover, when the second switchover marker 386 is missed, the streaming system 372 may refer back to the scheduling rules 350, after the threshold amount of time, to cause provision of the streaming content according to the scheduling rules 350. Accordingly, the streaming system 372 may not accidently switch to UHD streaming content when the station bypass rule 358 is lifted and UHD streaming content is terminated (e.g., as indicated by the termination indication 398). Similar to previous examples, an "end of UHD" API command may also be provided to prevent being stuck in the second live broadcasting stream 104.

Figure 8E:
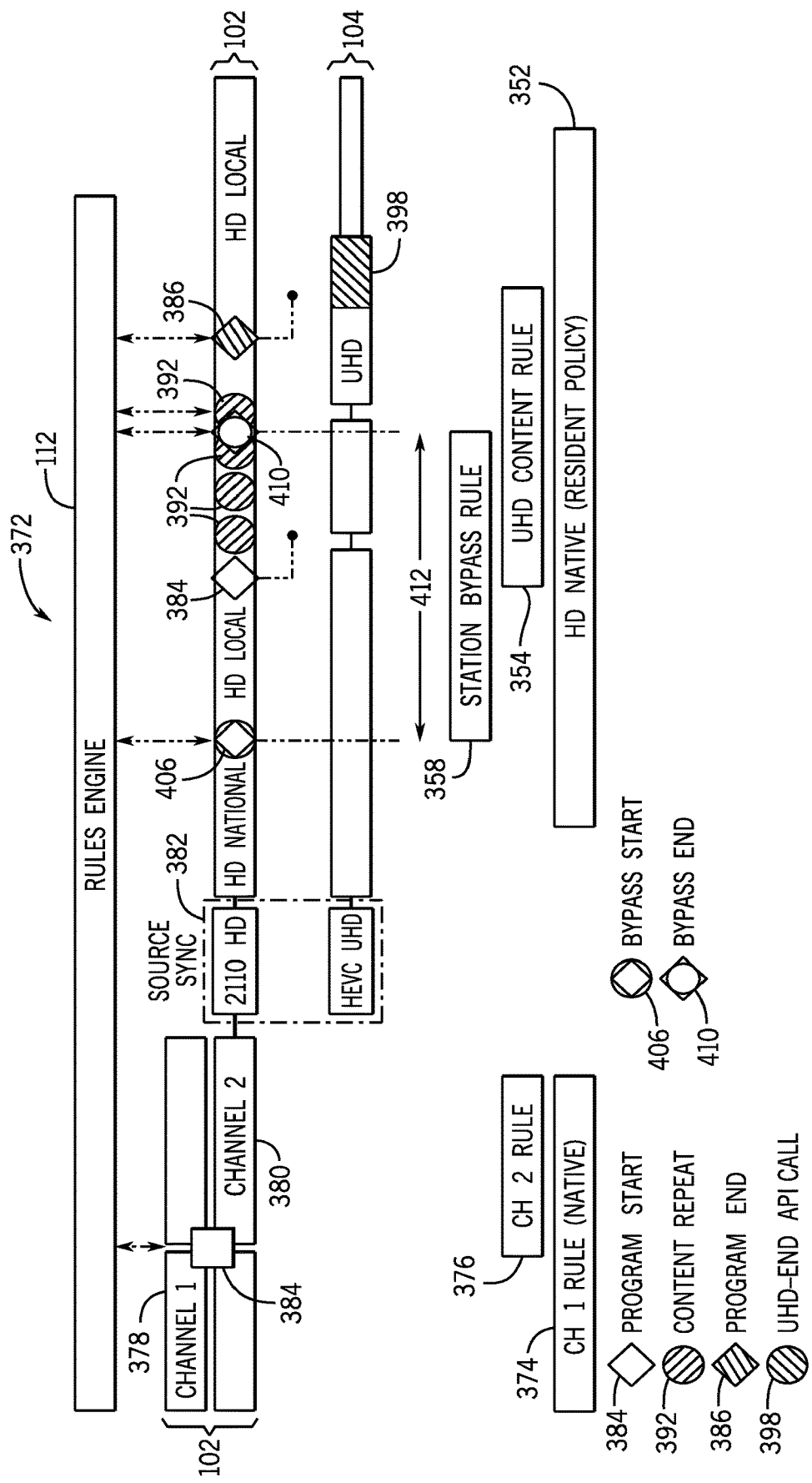

FIG. 8E may illustrate a different embodiment of the streaming system 372 using the scheduling rules 350. Here, a bypass start switchover marker 406 is inserted into the first live broadcasting stream 102 to cause the first live broadcasting stream 102 to switch from HD national content to HD local content, for example. The streaming system 372 may receive the bypass start switchover marker 406 to begin provision of the prioritized streaming content during provision of the first live broadcasting stream 102. In one embodiment, the bypass start switchover marker 406 may be provided by a controller positioned locally with respect to the content origination source associated with the first live broadcasting stream 102. As described above, the bypass start switchover marker may trigger the bypass rule 358. However, in the depicted embodiment, the prioritized streaming content may be provided via the first live broadcasting stream 102. Accordingly, the streaming system 372 may continue to provide the streaming content of the first live broadcasting stream 102.

Similar to the embodiment of FIG. 8D, a prioritized streaming content may be provided at a time segment 412 based on receiving the bypass start switchover marker 406 and the bypass end switchover marker 410. However, in the depicted embodiment of FIG. 8E, the time segment 412 may occur between provision of the first live broadcasting stream 102 and the second live broadcasting stream 104. In one example, the local programming provided by the first live broadcasting stream 102 may end at a later time than an originally scheduled termination time. In a different example, the local breaking news may become extended between streaming contents provided by the first live broadcasting stream 102 and the second live broadcasting stream 104.

Subsequently, in the depicted embodiment, the first switchover marker 384 is received during the provision of the prioritized streaming content. Accordingly, the streaming system 372 may miss the first switchover marker 384 and a number of content repeat markers 392 since the bypass rules still applies. However, the streaming system 372 may continue to receive the recurring content repeat markers 392. As such, upon receiving the bypass end switchover marker 410, the streaming system 372 may use subsequent content repeat markers 392 to cause immediate provision of the second live broadcasting stream 104. That is, the bypass end switchover marker 410 may remove the station bypass rule 358 to allow the streaming system 372 to use the subsequent markers, such as the content repeat markers 392.

Figure 8F:
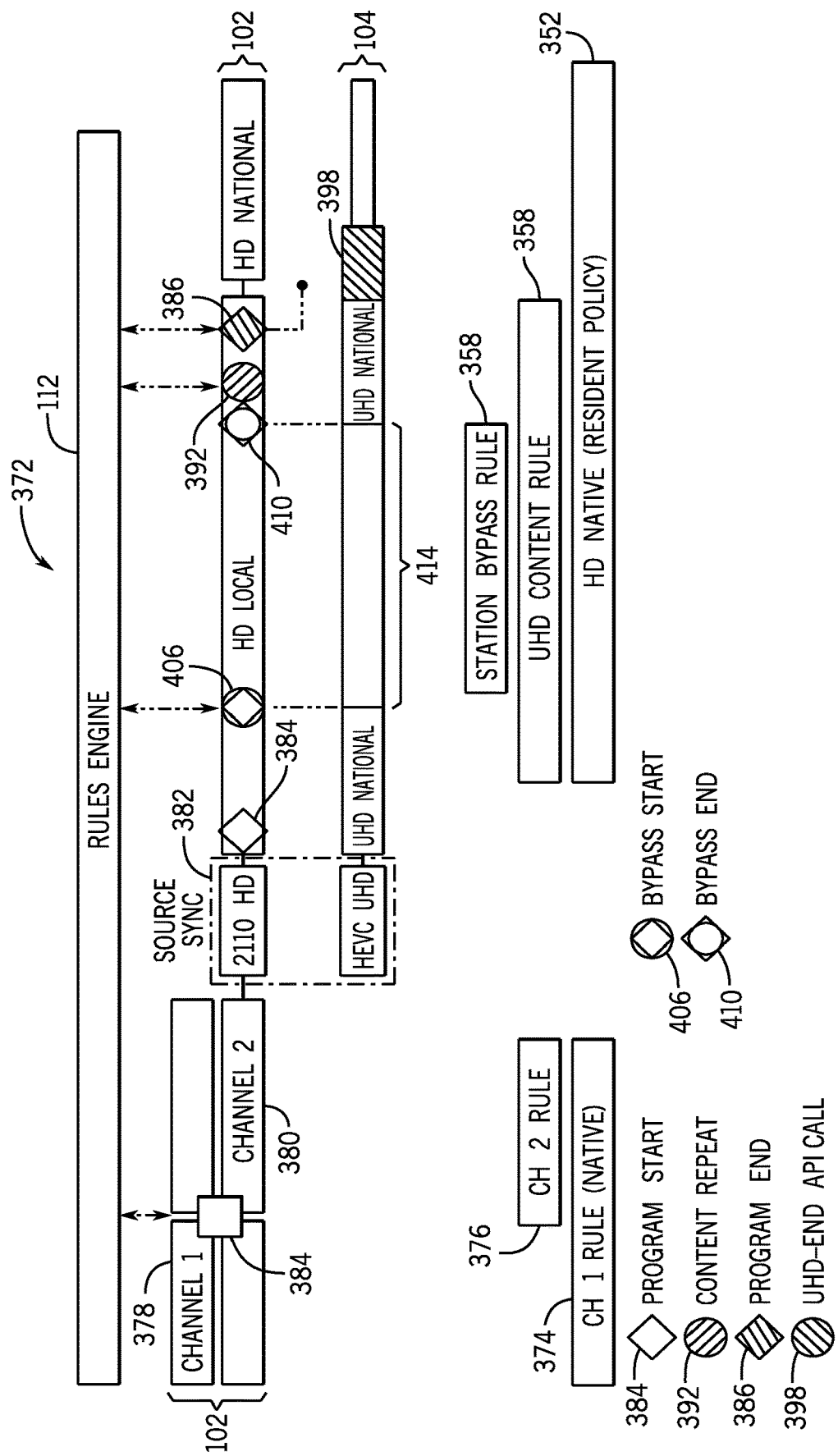

FIG. 8F depicts yet another embodiment of the streaming system 372 using the scheduling rules 350. The first switchover marker 384 indicates a switch to the second live broadcasting stream 104. At the first bypass start switchover marker 406, the prioritized streaming content may be provided during a time segment 414 in between provision of UHD streaming content provided by the second live broadcasting stream 104. As described above, the station bypass rule 358 may take priority over the UHD content rule 354 and the HD native rule 354. Accordingly, when the streaming system 372 receives the bypass start switchover marker 406, the streaming system 372 may switchover to provide the prioritized streaming content. In one embodiment, the streaming system 372 may switch over to the first live broadcasting stream 102 to cause provision of the prioritized streaming content. In other embodiments, the streaming system 372 may switchover to other broadcasting streams to cause provision of the prioritized streaming content.

Nevertheless, upon receiving the bypass end switchover marker 410, the streaming system 372 may return to normal provision of the streaming content using the UHD content rule 354 and the HD native policy 352 rule based on the subsequent markers. For example, in the depicted embodiment, the streaming system 372 may cause continued provision of the second live broadcasting stream 104 (e.g., based on receiving the content repeat marker 392). Subsequently, the streaming system 372 may receive the second switchover marker 386 and switchover to the first live broadcasting stream 102. As with previous example, an "end of UHD" API command may be inserted into the second live broadcasting stream 104 to prevent the streaming system 372 from remaining with the second live broadcasting stream 104.

That said, in the depicted embodiments of FIGS. 8A-8F, although the switchover markers are depicted with respect to the first live broadcasting stream 102, the rules engine 112 may also receive the switchover markers with the second live broadcasting stream 104. For example, the rules engine 112 may receive the switchover markers with the second live broadcasting stream 104 and cause switching to or switching away from the second live broadcasting stream 104 based on the scheduling rules associated with each switchover marker.

Figure 9:
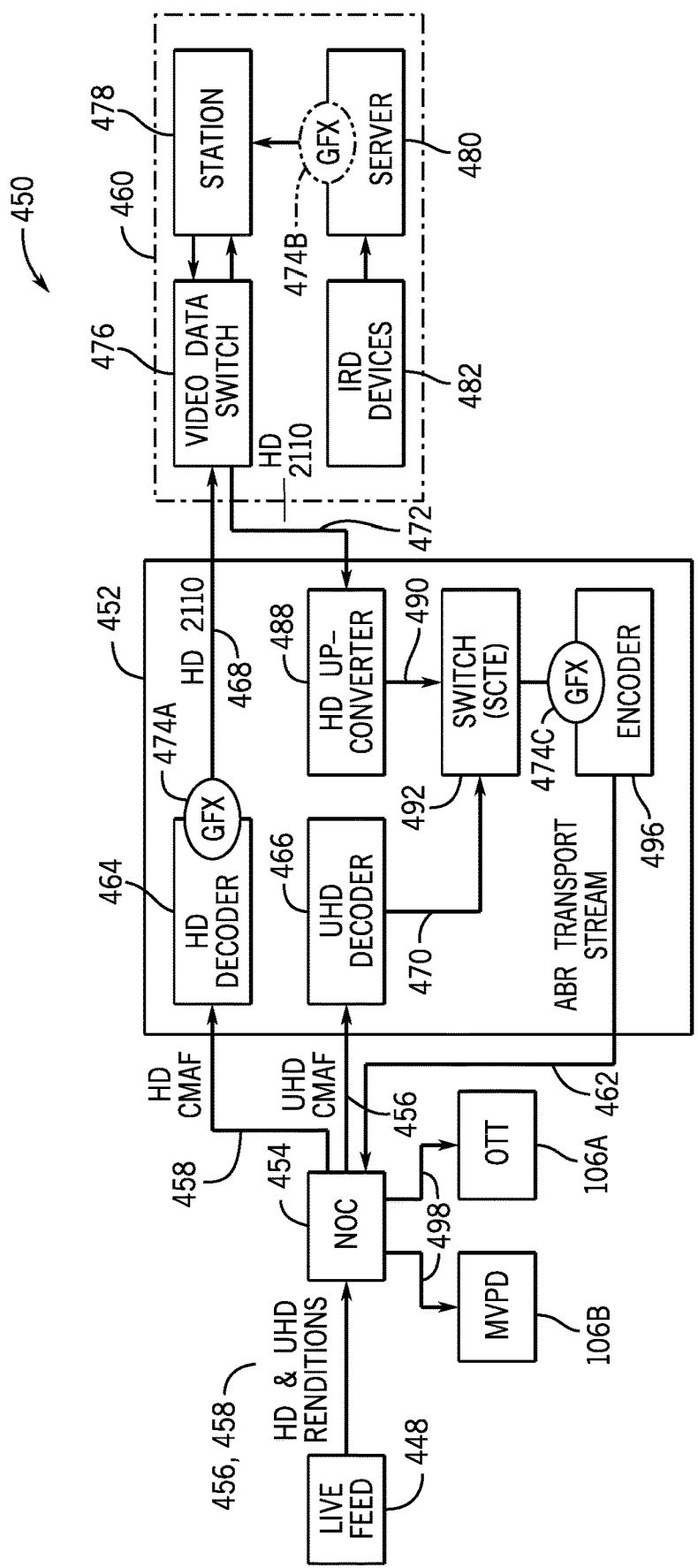
FIG. 9 depicts a schematic representation of a streaming system with a UHD streaming default rule.

FIG. 9 depicts a streaming system 450 that may distribute upstream UHD streaming content (high quality streaming content) from the UHD content source 148 to the content viewing devices 106 by incorporating streaming content of other NOCs and/or affiliate content distributors. For example, a default scheduling rule of the embodiment of FIG. 9 may be provision of UHD streaming content (instead of HD streaming content). Moreover, the upstream streaming content may be live content that may be received in real-time or near real-time compared to a production time of the streaming content.

In some embodiments, the streaming system 450 may be similar to streaming systems 100, 140, 220, and/or 372 described above. However, in different embodiments, the streaming system 450 may include different components and/or architecture. For example, in different embodiments, the streaming system 450 may use a rules engine 452 that may be similar to or different from the rules engine 112 described above. Moreover, although the embodiment of FIG. 9 is described with respect to HD and UHD streaming quality, it should be appreciated that HD and UHD streaming quality are merely by the way of example and other streaming qualities may be used in different embodiments. With that in mind, a NOC 454 may receive UHD live content 456 and HD live content 458 from a content source 448. The NOC 454 may provide the UHD live content 456 along with an affiliate UHD streaming content 462 (e.g., ABR Transport Stream) to the content viewing devices (e.g., distribution channels) such as a multichannel video program distributor (MVPD) 106B or an OTT service 106A, which is an authenticated streaming or authenticated video on-demand service.

In the depicted embodiment, an affiliate content distributor 460 may provide an affiliate HD streaming content 472 that may be up-converted and synchronized via the rules engine 452. For example, the affiliate HD streaming content 472 may be up-converted to UHD streaming quality (e.g., the affiliate UHD streaming content 462) and synchronized for provision with the UHD live content 456 (e.g., using switchover markers in a hybrid stream), as will be appreciated. Moreover, although the embodiment of FIG. 9 is described with respect to the affiliate UHD streaming content 462, in different embodiments, the affiliate content distributor 460 may provide streaming content using other streaming qualities. Moreover, in different embodiments, the affiliate content distributor 460 may be any downlink station such as a downlink NOC.

The NOC 454 may provide the UHD live content 456 and the HD live content 458 to the rules engine 452 to facilitate synchronized provision of the UHD live content 456 with the affiliate UHD streaming content 462. In some embodiments, the NOC 454 may provide the HD live content 458 to an HD decoder 464 and the UHD live content 456 to a UHD decoder 466. In different embodiments, the HD decoder 464 and the UHD decoder 466 may be part of one device or disposed exclusively. In specific embodiments, the HD decoder 464 and the UHD decoder 466 may be similar to or a portion of the packaging units 158A and/or 158B, described above with respect to FIG. 2. Moreover, the HD decoder 464 and the UHD decoder 466 may receive switchover markers of the HD live content 458 and the UHD live content 456, respectively, with the raw streaming content or within an accompanied manifest file.

Nevertheless, the HD decoder 464 and the UHD decoder 466 may decode the received streaming contents. Moreover, the HD decoder 464 and the UHD decoder 466 may provide decoded HD live content 468 and decoded UHD live content 470 to facilitate up-converting the affiliate HD streaming content 472 received from the affiliate content distributor 460 to UHD streaming quality. In some embodiments, a graphics up-convert unit 474A may also be associated with the HD decoder 464. In different embodiments, the HD decoder 464 may include the graphics up-convert unit 474A or may be communicatively connected to the graphics up-convert unit 474A. For example, the graphics up-convert unit 474A may up-convert a graphics of the HD live content 458, after decoding by the HD decoder 464, and before transmission of the decoded HD live content 468.

In specific embodiments, the graphics up-convert unit 474A may up-convert the graphics of the HD live content 458 to match a graphics of the UHD live content 456. For example, the UHD live content 456 may use HTML5 graphics and the graphics up-convert unit 474A may up-convert a graphics of the HD live content 458 to HTML5 graphics before transmission of the decoded HD live content 468. Moreover, in some embodiments, the graphics up-convert unit 474A may also up-convert an audio of the HD live content 458 to match an audio quality of the UHD live content 456. For example, the graphics up-convert unit 474A may up-convert the audio of the HD live content 458 by embedding Nielsen audio watermarking in the decoded HD live content 468.

In the depicted embodiment, the HD decoder 464 may provide the decoded HD live content 468 to the affiliate content distributor 460. The affiliate content distributor may use a video data switch 476 to cause bi-directional communication/synchronization between affiliate streaming content and the decoded HD live content to cause timely provision of the affiliate HD streaming content 472 with respect to the decoded HD live content 468. For example, the video data switch 476 may communicate with a station 478 (e.g., server network) and cause setting packet timings of the affiliate HD streaming content 472 with respect to the decoded HD live content 468. In specific embodiments, the video data switch may provide switchover markers with the affiliate HD streaming content 472 (e.g., in the form of a manifest file or provided with raw streaming content).

In turn, the station 478 may provide raw streaming data control based on ESAM/Control traffic received from a server 480. In one embodiment, the server 480 may include a respective graphics up-convert unit 474B and may receive the raw streaming data from IRD devices 482. In specific embodiments, the IRD devices 482 may receive signals associated with affiliate streaming content and convert digital information transmitted in the signals for the server 480 interpretation.

Accordingly, the video data switch 476 may provide the affiliate HD streaming content 472 (which may include the decoded HD live content 468 in some embodiments) to an HD up-converter 488, based on receiving the decoded HD live content 468 and/or raw streaming data received from the station 478. The HD up-converter 488 may up-convert the affiliate HD streaming content 472 and transmit the raw affiliate UHD streaming content 490 to a switch component 492. The raw affiliate UHD streaming content 490 may be aligned/synchronized with a timing of the UHD live content 456. For example, the UHD decoder 466 may provide the decoded UHD live content 470 in packeted format, with switchover markers, and/or with a manifest file including the switchover markers.

Moreover, the switch component 492 may embed switchover markers with the raw affiliate UHD streaming content 490 or provide a respective manifest file (e.g., or a merged manifest file) including the switchover markers based on receiving the decoded UHD live content 470 from the UHD decoder 466 and the raw affiliate UHD streaming content 490. In some embodiments, the switch component 492 may be included in a packaging unit, such as the packaging units 158A and/or 158B described above. In some embodiments, the switch component 492 may incorporate a rules engine, such as the rules engine 112 described previously.

Subsequently, the switch component 492 may provide packaged content 494, including the raw affiliate UHD streaming content 490 and the respective switchover markers (e.g., in the form of a merged manifest file), to an encoder component 496. In some embodiments, the encoder component 496 may include (or be communicatively connected to) a graphics up-convert unit 474C. Similar to the graphics up-convert unit 474A and 474B, in some embodiment, the graphics up-convert unit 474C may up-convert a graphics and audio quality of the packaged content 494. For example, the graphics up-convert unit 474C may up-convert the packaged content 494 to include HTML5 graphics and/or include Nielsen audio watermarking encoding.

Moreover, the encoder component 496 may encode the packaged content 494 using a video compression encoding scheme, such as HEVC video compression standard. In some embodiments, the encoder component 496 may be included or similar to the local encoder 152 and/or encoding unit 156 described above. As such, the encoder component 496 may provide the affiliate UHD streaming content 462 in the packaged and encoded form to the NOC 454 to cause provision of a hybrid stream 498 including the UHD live content 456 and the affiliate UHD streaming content 462. Accordingly, the streaming system 450 may facilitate provision of the hybrid stream 498 using UHD streaming quality. However, the use of UHD and HD streaming quality, HTML5 graphics, and/or Nielsen audio watermarking is by the way of example and it should be appreciated that similar techniques may be used for providing a hybrid stream by a master controller (e.g., the NOC 454) using the highest possible streaming quality using a respective rules engine (e.g., rules engine 452).

Figure 10:
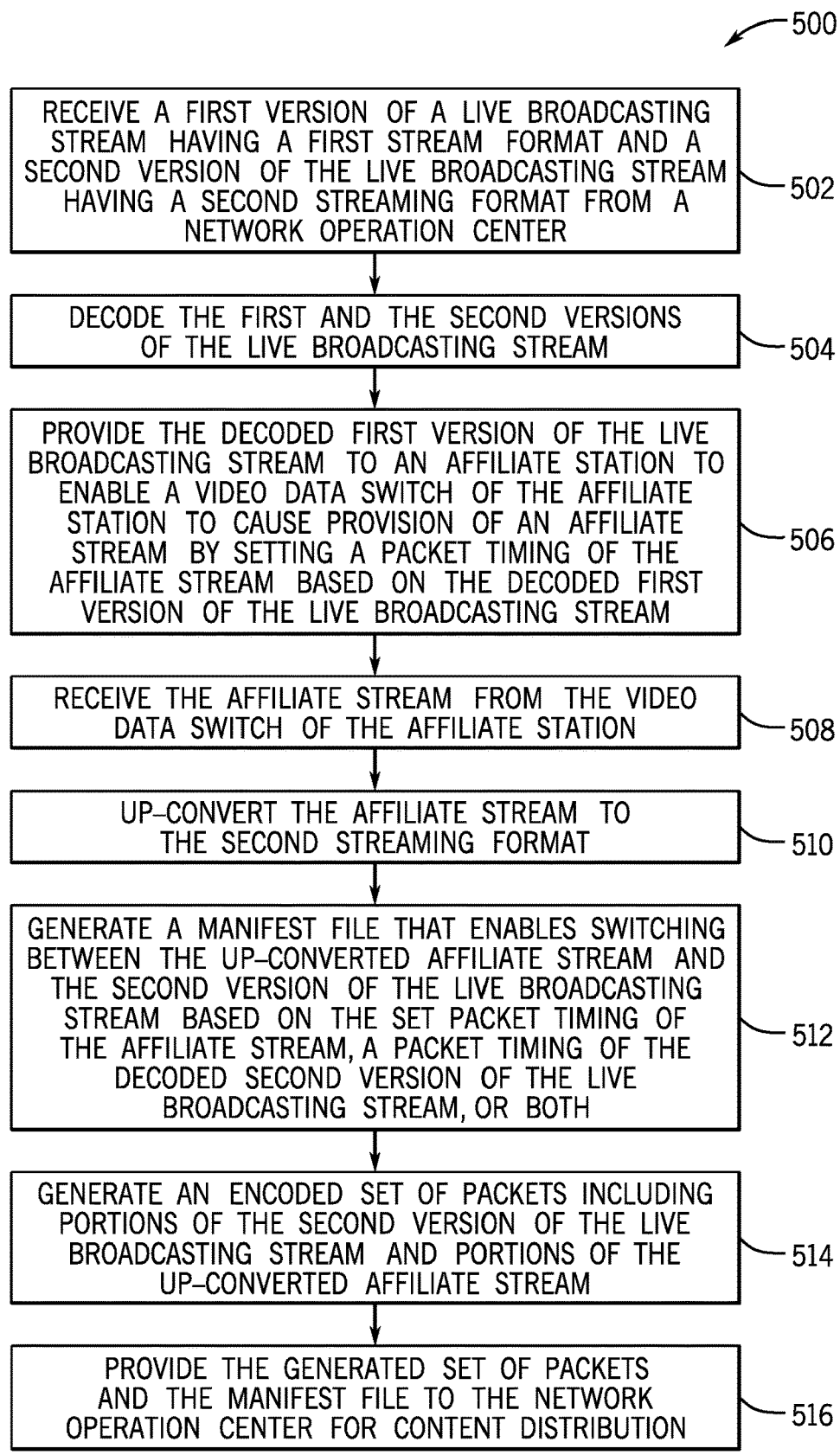
FIG. 10 depicts a process for providing streaming content with a UHD streaming default rule.

With the Foregoing in mind, FIG. 10 depict a process 500. According to one embodiment of the present disclosure, the process blocks of the process 500 is described below with respect to the streaming system 450 discussed above. That said, in different embodiments, any other viable streaming system may also perform the process 500. Moreover, although the process 500 is described according to a certain order, in different embodiments, the process 500 may be performed in different orders, additional process blocks may be used, or some process blocks may be omitted.

By the way of example, at block 502, the streaming system may receive the first version of a live broadcasting stream having a first streaming format and a second version of the live broadcasting stream having a second streaming format from a network operation center. For example, the first version of a live broadcasting stream having a first streaming format may refer to the HD live content 458 delivered to the rules engine 452 by the NOC 454. Moreover, the second version of the live broadcasting stream having a second streaming format may refer to the UHD live content 456 delivered to the rules engine 452 by the NOC 454, as described above.

At block 504, the streaming system may decode the first and the second versions of the live broadcasting stream. For example, the streaming system 450 may use the HD decoder 464 and the UHD decoder 466 to decode the first and the second versions of the live broadcasting stream. Accordingly, the streaming system may determine the decoded packets of the first and the second versions of the live broadcasting stream for further processing.

Subsequently, at block 506, the streaming system may provide the decoded first version of the live broadcasting stream to an affiliate station to enable a video data switch of the affiliate station to cause provision of an affiliate stream by setting a packet timing of the affiliate stream based on the decoded first version of the live broadcasting stream. For example, in the streaming system 450, the rules engine 452 may provide the decoded HD live content 468 to the video data switch 476 of the affiliate content distributor 468 to cause timely provision of the affiliate HD streaming content 472. That said, in different embodiments, other downlink stations or downlink content distributors, such as additional downstream NOCs may receive the decoded first version of the live broadcasting stream to provide a downlink stream (e.g., the affiliate stream).

At block 508, the streaming system may receive the affiliate stream (e.g., the affiliate HD streaming content 472) from the video data switch of the affiliate station. In different embodiments, the affiliate station may provide the affiliate stream using different streaming formats (e.g., resolution, frame rate, graphics, audio quality, etc.). Accordingly, at block 510, the streaming system may up-convert the affiliate stream to the second streaming format. With respect to the embodiment of FIG. 9, the HD up-converter 488 may receive and up-convert the affiliate HD streaming content 472 to provide the raw affiliate UHD streaming content 490.

Subsequently, at block 512, the streaming system may generate a manifest file that enables switching between the up-converted affiliate stream and the second version of the live broadcasting stream. The streaming system may generate the manifest file based on the set packet timing of the affiliate stream, a packet timing of the decoded second version of the live broadcasting stream, or both. Although a manifest file is described with respect to block 512, in some embodiments, the streaming system may provide raw switchover markers (instead of a manifest file) with the packaged output in block 512. For example, the switch component 492 may receive the raw affiliate UHD streaming content 490 and the decoded UHD live content 470 to generate the packaged content 494 including the switchover markers and/or the manifest file.

At block 514, the streaming system may generate an encoded set of packets including portions of the second version of the live broadcasting stream and portions of the up-converted affiliate stream (e.g., the affiliate UHD streaming content including affiliate provided streaming content and the UHD live content). Subsequently, at block 516, the streaming system may provide the generated set of packets and the manifest file to the network operation center for content distribution. For example, the NOC 454 may receive the affiliate UHD streaming content 462 and provide the received content to the content viewing devices 106.

By the way of using the described systems and techniques, a linear content distribution system may provide live streaming content to the content viewing devices using the original content production quality. Moreover, such linear content distribution systems may cause provision of the live streaming content using the highest possible content distribution quality by bypassing traditional content distribution limitations. Accordingly, incorporating the systems and techniques described above may provide a technical solution to a technical problem that results in improved systems.

The invention claimed is:

1. A method, comprising:
receiving, by a rules engine and from a network operation center, a first version of a live broadcasting stream having a first streaming format and a second version of the live broadcasting stream having a second streaming format;
decoding, by the rules engine, the first and the second versions of the live broadcasting stream;
providing, by the rules engine, the decoded first version of the live broadcasting stream to a downlink station;
receiving, by the rules engine, a downlink stream from the downlink station with set packet timings in response to providing the decoded first version of the live broadcasting stream;
up-converting, by the rules engine, the downlink stream received from the downlink station to the second streaming format; and
generating, by the rules engine, a manifest that enables switching between the up-converted downlink stream and the second version of the live broadcasting stream.

2. The method of claim 1, comprising:
generating, by the rules engine, an encoded set of packets comprising at least a portion of the second version of the live broadcasting stream and at least a portion of the up-converted downlink stream based on the manifest; and
providing, by the rules engine, the generated set of packets and the manifest to the network operation center for content distribution.

3. The method of claim 1, comprising:
up-converting, by the rules engine, a graphic of the first version of the live broadcasting stream to an HTML5 format after decoding the first version and before providing the first version to the downlink station; and
up-converting, by the rules engine, an audio of the first version of the live broadcasting stream to a higher quality audio.

4. The method of claim 1, wherein the first streaming format is a high-definition (HD) format and the second streaming format is an ultra-high-definition (UHD) format.

5. A system for content distribution, comprising:
a network operation center configured to provide a first version of a live broadcasting stream having a first streaming format and a second version of the live broadcasting stream having a second streaming format; and
a rules engine configured to:
receive the first and the second versions of the live broadcasting stream;
decode the first and the second versions of the live broadcasting stream;
provide the decoded first version of the live broadcasting stream to an affiliate station to enable a video data switch of the affiliate station to cause provision of an affiliate stream by setting a packet timing of the affiliate stream based on the decoded first version of the live broadcasting stream;
receive the affiliate stream from the video data switch;
up-convert the affiliate stream to the second streaming format; and
generate a manifest that enables switching between the up-converted affiliate stream and the second version of the live broadcasting stream based on the set packet timing of the affiliate stream, a packet timing of the decoded second version of the live broadcasting stream, or both.

6. The system of claim 5, wherein the rules engine is further configured to:
generate an encoded set of packets comprising at least a portion of the second version of the live broadcasting stream and at least a portion of the up-converted affiliate stream; and
provide the generated set of packets and the manifest to the network operation center for content distribution.

7. The system of claim 6, wherein the set of packets is encoded based on the manifest.

8. The system of claim 5, wherein the rules engine comprises an up-conversion unit configured to up-convert a graphic from the first version of the live broadcasting stream to an HTML5 format after the first version has been decoded and before the first version is provided to the video data switch.

9. The system of claim 8, wherein the up-conversion unit is further configured to up-convert an audio of the first version of the live broadcasting stream to a higher quality audio.

10. The system of claim 5, wherein the first streaming format is a high-definition (HD) format and the second streaming format is an ultra-high-definition (UHD) format.

11. A tangible, non-transitory, machine-readable medium, comprising machine-readable instructions that, when executed by a processor, cause the processor to perform actions comprising:
- receiving a first version of a live broadcasting stream having a first streaming format and a second version of the live broadcasting stream having a second streaming format;
- decoding the first and the second versions of the live broadcasting stream;
- providing the decoded first version of the live broadcasting stream to an affiliate station to enable a video data switch of the affiliate station to cause provision of an affiliate stream by setting a packet timing of the affiliate stream based on the decoded first version of the live broadcasting stream;
- receiving the affiliate stream from the video data switch;
- up-converting the affiliate stream to the second streaming format; and
- generating a manifest that enables switching between the up-converted affiliate stream and the second version of the live broadcasting stream based on the set packet timing of the affiliate stream, a packet timing of the decoded second version of the live broadcasting stream, or both.

12. The tangible, non-transitory, machine-readable medium of claim 11, wherein the processor is configured to perform the actions comprising:
- generating an encoded set of packets comprising at least a portion of the second version of the live broadcasting stream and at least a portion of the up-converted affiliate stream; and
- providing the generated set of packets and the manifest to a network operation center for content distribution.

13. The tangible, non-transitory, machine-readable medium of claim 12, wherein the set of packets is encoded based on the manifest.

14. The tangible, non-transitory, machine-readable medium of claim 11, wherein the processor is configured to perform the actions comprising up-converting a graphic from the first version of the live broadcasting stream to an HTML5 format after the first version has been decoded and before the first version is provided to the video data switch.

15. The tangible, non-transitory, machine-readable medium of claim 11, wherein the processor is configured to perform the actions comprising up-converting an audio of the first version of the live broadcasting stream to a higher quality audio.

16. The tangible, non-transitory, machine-readable medium of claim 11, wherein the first streaming format is a high-definition (HD) format and the second streaming format is an ultra-high-definition (UHD) format.

17. The tangible, non-transitory, machine-readable medium of claim 11, wherein generating the manifest that enables switching between the up-converted affiliate stream and the second version of the live broadcasting stream comprises generating a plurality of switchover markers associated with the affiliate stream or the second version of the live broadcasting stream based on the set packet timing of the affiliate stream, the packet timing of the decoded second version of the live broadcasting stream, or both.

18. The tangible, non-transitory, machine-readable medium of claim 17, wherein the plurality of switchover markers comprise a first switchover marker indicating a switch from the second version of the live broadcasting stream to the affiliate stream or indicates a switch from the affiliate stream to the second version of the live broadcasting stream.

19. The tangible, non-transitory, machine-readable medium of claim 18, wherein the first switchover marker comprises an identifier that identifies:
- a streaming content, a streaming quality of the streaming content, or both; and
- a time within a schedule for providing the streaming content, the streaming quality of the streaming content, or both.

20. The tangible, non-transitory, machine-readable medium of claim 11, wherein the processor is configured to perform the actions comprising:
- receiving the first and the second versions of the live broadcasting stream from a first content stream origination source;
- receiving a second live broadcasting stream having the second streaming format from a second content origination source;
- decoding the second live broadcasting stream;
- generating the manifest that enables switching between the up-converted affiliate stream, the second version of the live broadcasting stream, and the second live broadcasting stream based on the set packet timing of the affiliate stream, the packet timing of the decoded second version of the live broadcasting stream, a packet timing of the decoded second live broadcasting stream, or any combination thereof;
- generating an encoded set of packets comprising at least a portion of the second live broadcasting stream; and
- providing the generated set of packets and the manifest to a network operation center for content distribution.

* * * * *